(12) United States Patent
Nakamura et al.

(10) Patent No.: US 11,254,426 B2
(45) Date of Patent: Feb. 22, 2022

(54) WING UNIT, WING FLAPPING APPARATUS, AND METHOD OF MANUFACTURING WING UNIT

(71) Applicant: Murata Manufacturing Co., Ltd., Nagaokakyo (JP)

(72) Inventors: Kazutaka Nakamura, Nagaokakyo (JP); Masaki Hamamoto, Sakai (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 328 days.

(21) Appl. No.: 16/412,678

(22) Filed: May 15, 2019

(65) Prior Publication Data

US 2019/0263517 A1    Aug. 29, 2019

Related U.S. Application Data

(63) Continuation of application No. PCT/JP2017/043018, filed on Nov. 30, 2017.

(30) Foreign Application Priority Data

Dec. 15, 2016  (JP) ............................. JP2016-243312

(51) Int. Cl.
*B64C 33/02*    (2006.01)

(52) U.S. Cl.
CPC .................................. *B64C 33/02* (2013.01)

(58) Field of Classification Search
CPC ................ B64C 33/00–25; B64C 3/24; B64C 2201/025
USPC ......................................... 244/11, 22, 28, 72
See application file for complete search history.

(56) References Cited

U.S. PATENT DOCUMENTS

| | | | | |
|---|---|---|---|---|
| 194,104 A | * | 8/1877 | Murrell | B64C 33/02 244/22 |
| 1,009,692 A | * | 11/1911 | Riout | B64C 33/02 244/22 |
| 2,021,627 A | * | 11/1935 | Gilpin | B64C 33/02 244/22 |

(Continued)

FOREIGN PATENT DOCUMENTS

| | | |
|---|---|---|
| GB | 1582539 A | 1/1981 |
| JP | S573503 B2 | 1/1982 |

(Continued)

OTHER PUBLICATIONS

International Search Report issued for PCT/JP2017/043018, dated Jan. 30, 2018.

(Continued)

*Primary Examiner* — Christopher D Hutchens
(74) *Attorney, Agent, or Firm* — Arent Fox LLP

(57) ABSTRACT

A wing unit is used in a wing flapping apparatus to perform a swinging motion to thereby generate levitation force. The wing unit includes a nonwoven fabric that forms a wing surface; a frame body overlaid on the nonwoven fabric and extending along the wing surface; and a resin material disposed in a cavity included in the nonwoven fabric to integrate the nonwoven fabric and the frame body with each other. According to this configuration, a light-weight and high-strength wing unit that produces a suppressed wing flapping noise, a wing flapping apparatus including the wing unit, and a method of manufacturing the wing unit are provided.

20 Claims, 17 Drawing Sheets

(56) References Cited

U.S. PATENT DOCUMENTS

| | | | | |
|---|---|---|---|---|
| 3,873,654 A | * | 3/1975 | Smith | B29C 70/865 |
| | | | | 264/258 |
| 2007/0210207 A1 | * | 9/2007 | Liao | B64C 39/028 |
| | | | | 244/22 |
| 2010/0308160 A1 | | 12/2010 | Keennon et al. | |
| 2012/0048994 A1 | | 3/2012 | Keennon et al. | |
| 2015/0008279 A1 | | 1/2015 | Keennon et al. | |
| 2016/0279884 A1 | * | 9/2016 | Cantwell | B29C 70/547 |
| 2018/0208306 A1 | | 7/2018 | Keennon et al. | |

FOREIGN PATENT DOCUMENTS

| | | | |
|---|---|---|---|
| JP | 2005028593 A | | 2/2005 |
| JP | 2005288142 A | | 10/2005 |
| JP | 2012529398 A | | 11/2012 |

OTHER PUBLICATIONS

Written Opinion of the International Search Authority issued for PCT/JP2017/043018, dated Jan. 30, 2018.

* cited by examiner

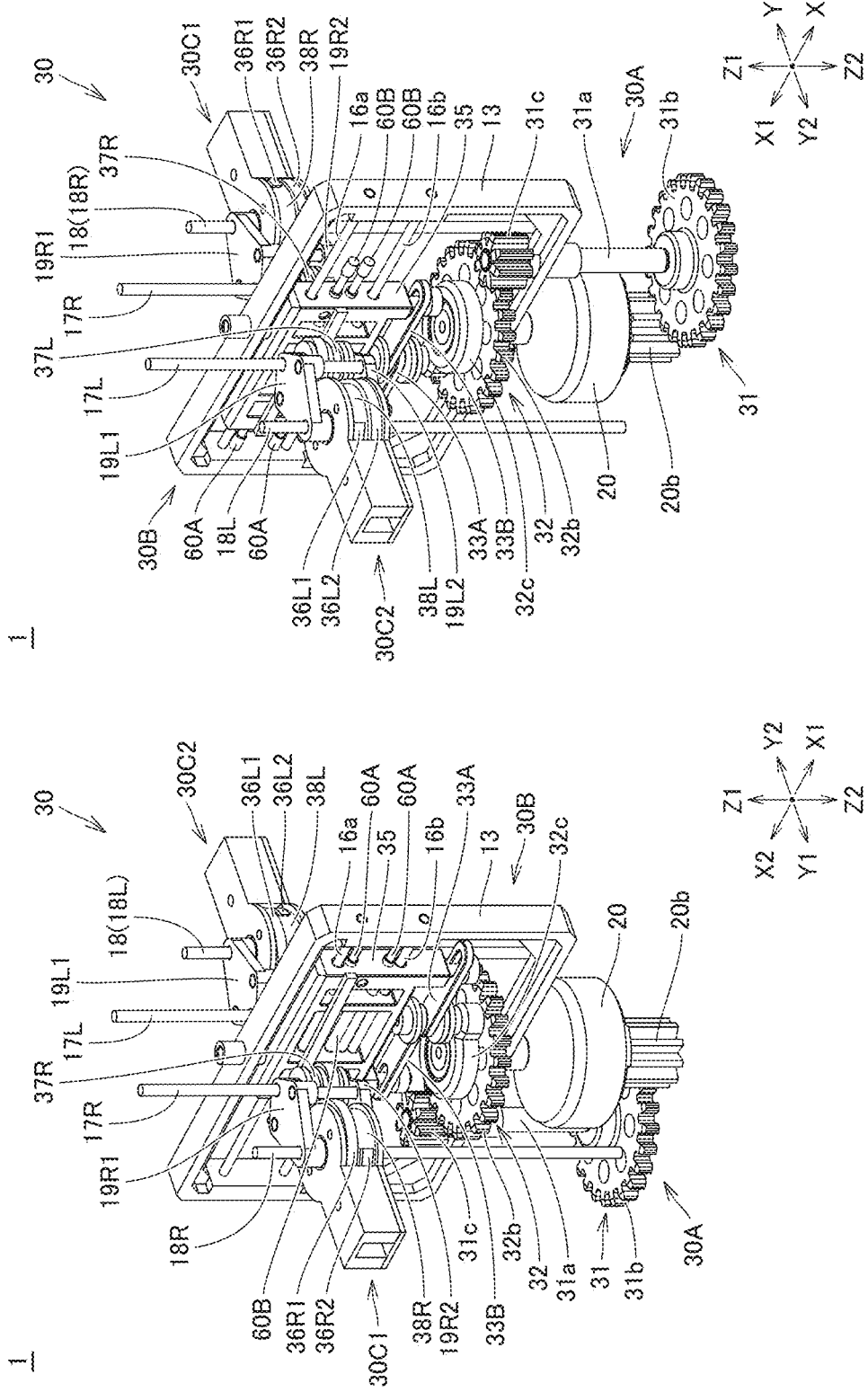

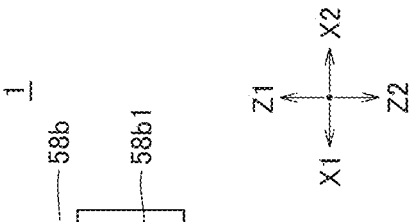
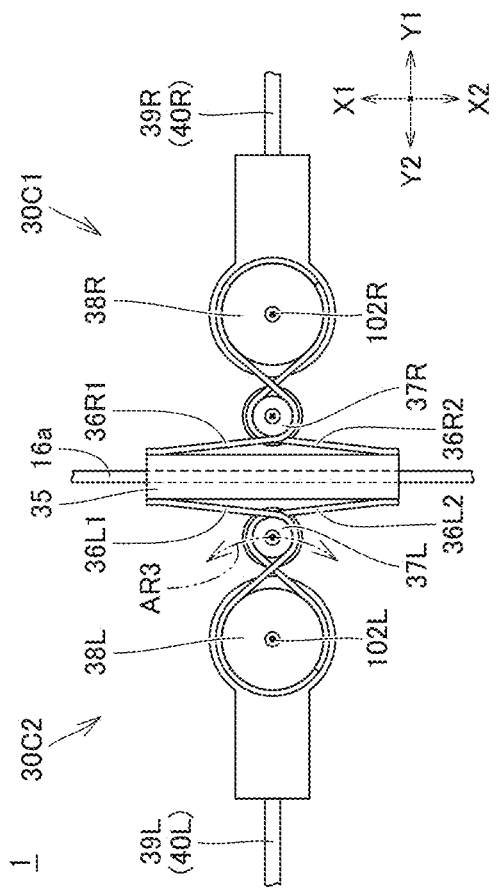
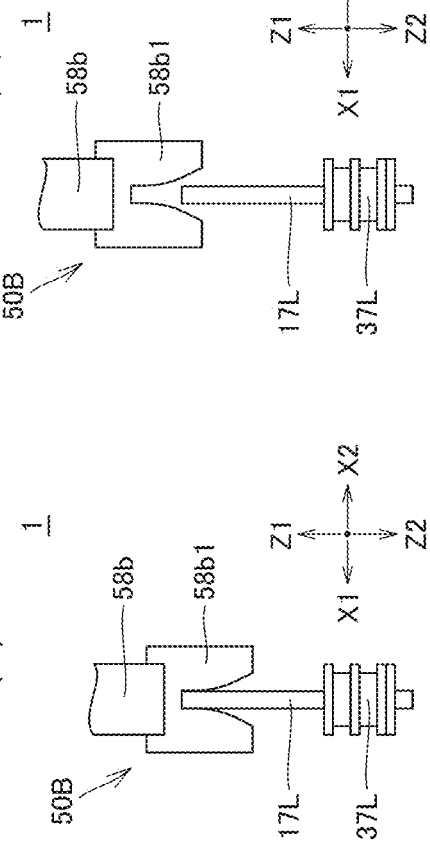
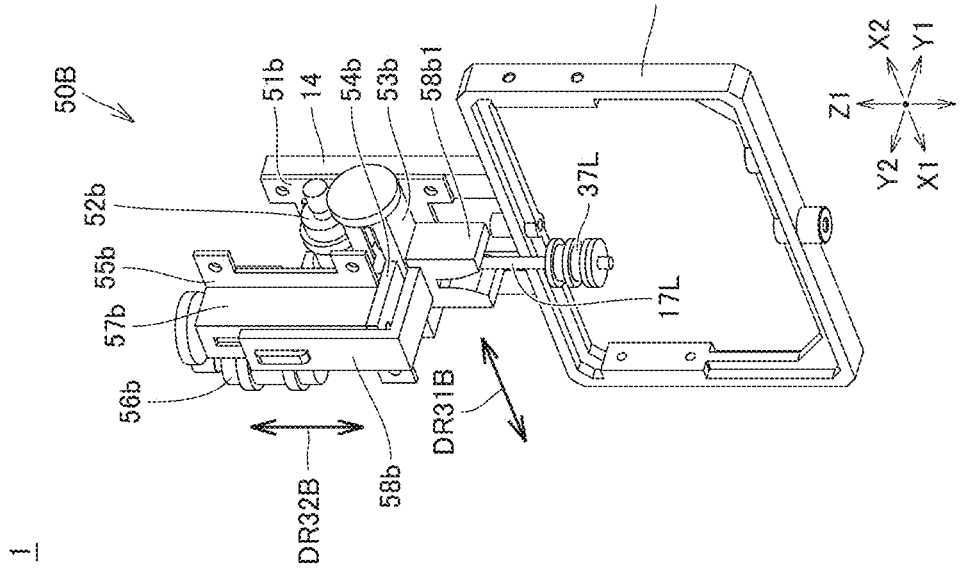

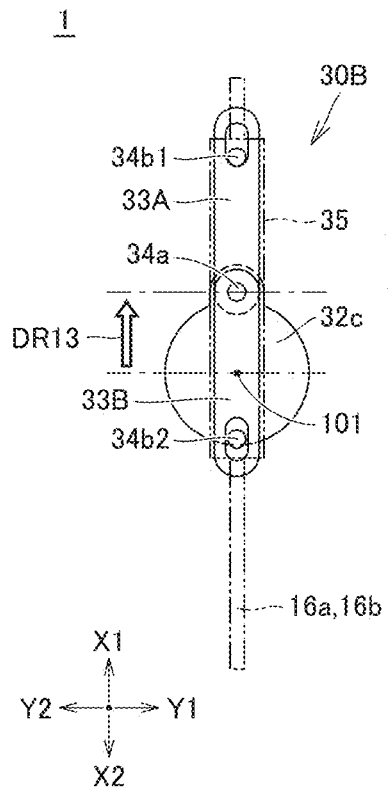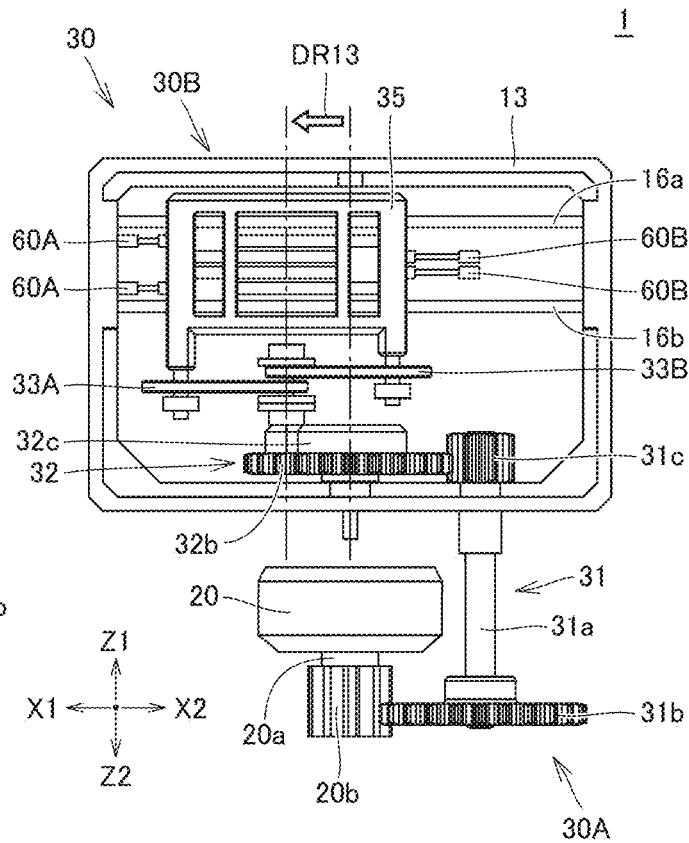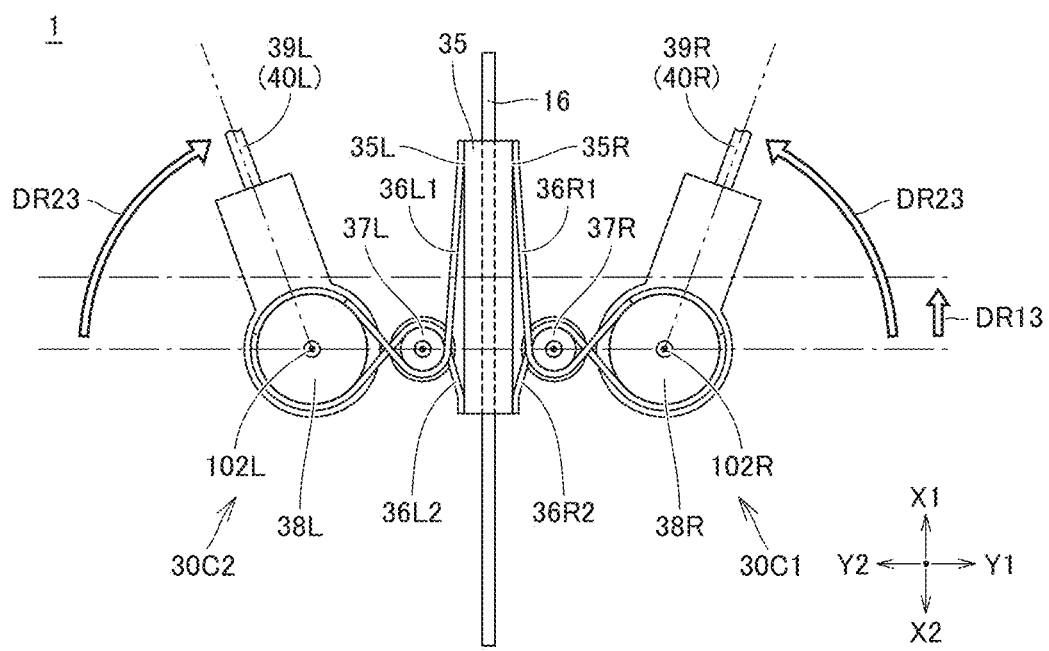

WING UNIT, WING FLAPPING APPARATUS, AND METHOD OF MANUFACTURING WING UNIT

CROSS REFERENCE TO RELATED APPLICATIONS

The present application is a continuation of PCT/JP2017/043018 filed Nov. 30, 2017, which claims priority to Japanese Patent Application No. 2016-243312, filed Dec. 15, 2016, the entire contents of each of which are incorporated herein by reference.

TECHNICAL FIELD

The present disclosure relates to a wing unit used in a wing flapping apparatus and configured to perform a swinging motion to generate levitation force; a wing flapping apparatus; and a method of manufacturing a wing unit.

BACKGROUND

Conventional wing flapping apparatuses, for example, as disclosed in Japanese Patent National Publication No. 2012-529398 (PTL 1), provide a wing flapping apparatus configured such that a rocker arm is attached at the base end of a mast having a wing unit attached thereto, in which the rotational motion output from a rotary motor serving as a driving source is converted by a crank into a reciprocating linear motion, thereby causing the rocker arm to be cyclically pushed and pulled, to allow the rocker arm to drive the mast, so that the wing unit swings back and forth.

PTL 1: Japanese Patent National Publication No. 2012-529398.

As disclosed in PTL 1, a wing flapping apparatus having a wing unit configured to perform a swinging motion to thereby generate levitation force is known. In order to improve the energy efficiency in such a wing flapping apparatus, the weight of the wing unit needs to be reduced while the strength of the wing unit needs to be sufficiently ensured so as to allow the wing unit to withstand the wind pressure received during its swinging motion.

Furthermore, the noise (i.e., wing flapping noise) caused by the swinging motion of the wing unit is increased depending on the material used for the wing unit. This may reduce the product value of the wing flapping apparatus.

SUMMARY OF THE INVENTION

Thus, the present disclosure aims to solve the above-described problems. Thus, according to exemplary embodiments, a light-weight and high-strength wing unit that produces a suppressed wing flapping noise; a wing flapping apparatus including the wing unit; and a method of manufacturing the wing unit, are provided.

In an exemplary aspect, a wing unit according to the present disclosure is provided that serves as a wing unit used in a wing flapping apparatus and that is configured to perform a swinging motion to generate levitation force. The wing unit includes a nonwoven fabric that forms a wing surface; a frame body overlaid on the nonwoven fabric and extending along the wing surface; and a resin material provided entirely over the wing surface and disposed in a cavity included in the nonwoven fabric to integrate the nonwoven fabric and the frame body with each other.

In an exemplary aspect, a wing unit according to the present disclosure is provided that serves as a wing unit used in a wing flapping apparatus and that is configured to perform a swinging motion to generate levitation force. The wing unit includes a nonwoven fabric that forms a wing surface; a frame body overlaid on the nonwoven fabric and extending along the wing surface; and a resin material disposed in a cavity included in the nonwoven fabric to integrate the nonwoven fabric and the frame body with each other.

A wing flapping apparatus according to the present disclosure includes: the above-mentioned wing unit; a framework; and an actuator mounted in the framework and configured to input a swinging motion to the wing unit.

According to another exemplary aspect, a method of manufacturing a wing unit according to the present disclosure is disclosed that provides for manufacturing a wing unit used in a wing flapping apparatus and configured to perform a swinging motion to generate levitation force. The method of manufacturing a wing unit includes preparing a nonwoven fabric, a resin material in a form of a sheet and identical in shape to the nonwoven fabric, and a frame body; and heating a stacked body including the nonwoven fabric, the resin material and the frame body, and thereby integrating the nonwoven fabric and the frame body with each other by the resin material.

A method of manufacturing a wing unit according to another exemplary aspect of the present disclosure is a method of manufacturing a wing unit used in a wing flapping apparatus and configured to perform a swinging motion to generate levitation force. The method of manufacturing a wing unit includes: preparing a nonwoven fabric, a resin material and a frame body; and heating a stacked body including the nonwoven fabric, the resin material and the frame body, and thereby integrating the nonwoven fabric and the frame body with each other by the resin material.

According to the exemplary embodiments of the present disclosure, a light-weight and high-strength wing unit that produces a suppressed wing flapping noise; a wing flapping apparatus including the wing unit; and a method of manufacturing the wing unit, are provided.

BRIEF DESCRIPTION OF DRAWINGS

FIGS. 3(A) and 3(B) are a perspective view of a power transmission mechanism.

FIGS. 7(A) to 7(D) are diagrams showing the configuration of a left-side roller control mechanism, the movable range of a left-side roller, and the operation of the left-side roller control mechanism.

FIGS. 10(A) to 10(C) are diagrams for illustrating the operation of the power transmission mechanism of the wing flapping apparatus.

DETAILED DESCRIPTION OF EXEMPLARY EMBODIMENTS

Figure 1:
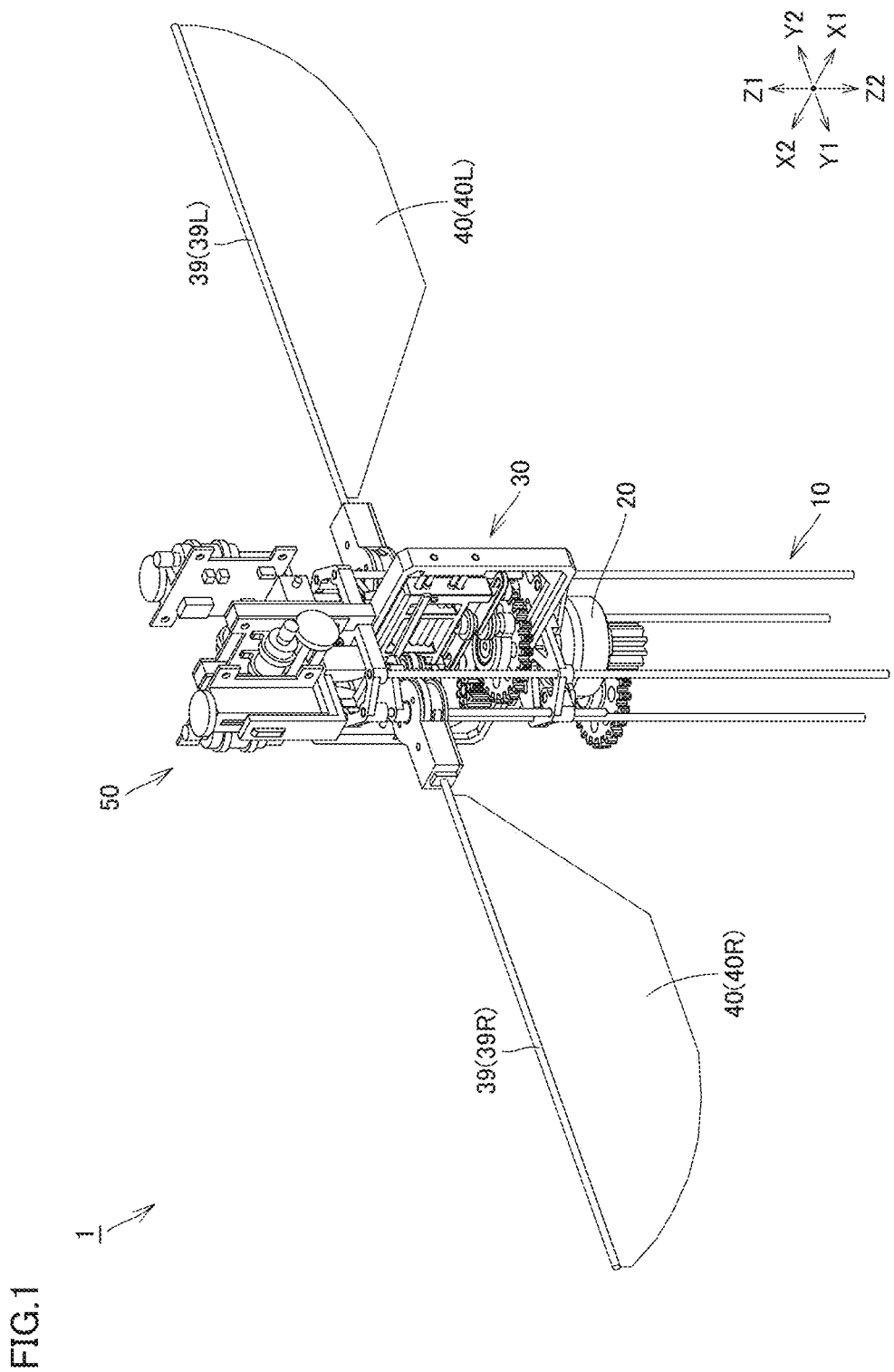
FIG. 1 is a schematic perspective view of a wing flapping apparatus in an embodiment.

Exemplary embodiments of the present disclosure will be hereinafter described with reference to the accompanying drawings, in which the same or corresponding components are designated by the same reference characters.

[Entire Configuration of Wing Flapping Apparatus]

Figure 2:
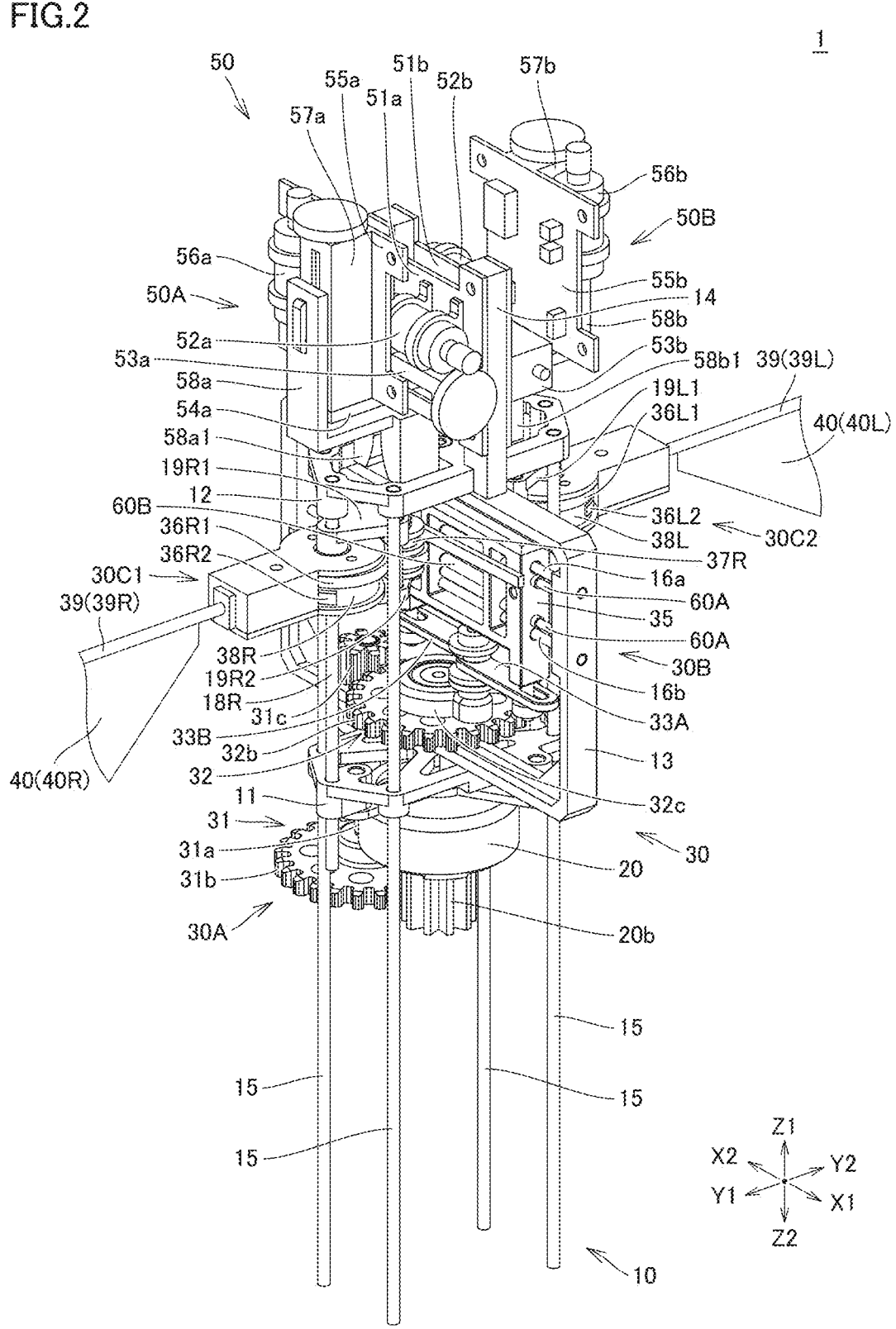
FIG. 2 is a schematic perspective view of a main part of the wing flapping apparatus.
Figure 4A:
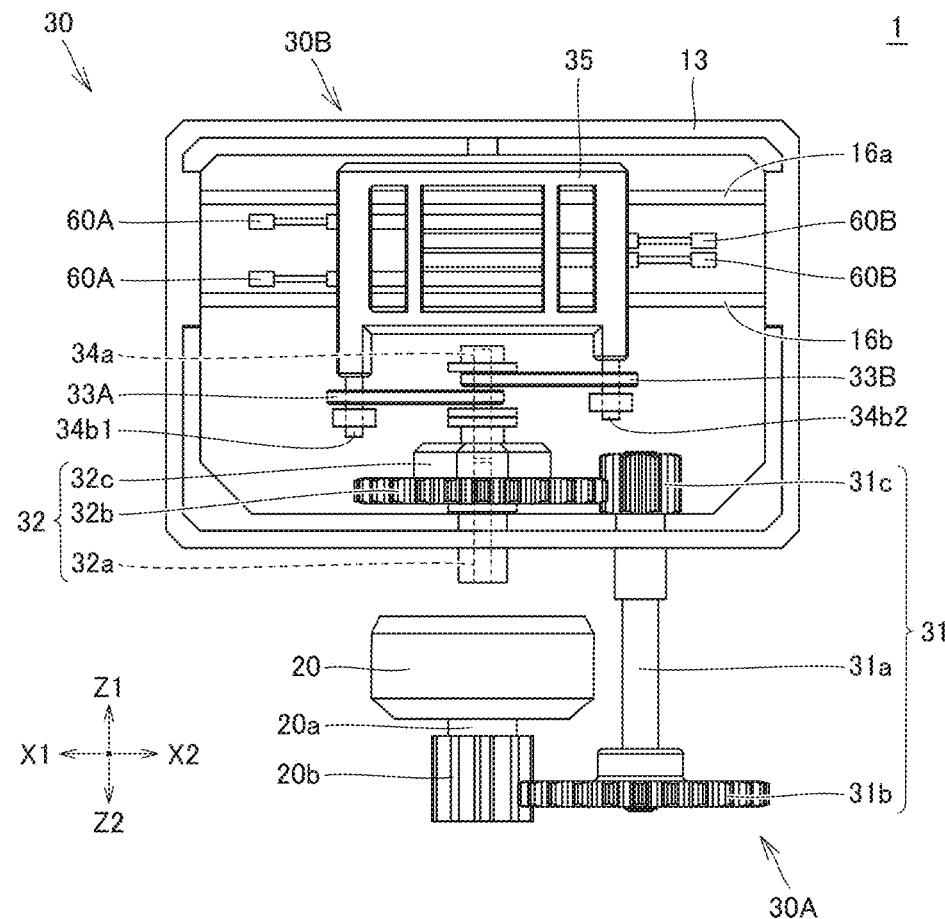
FIG. 4(A) is a diagram showing the configuration in the vicinity of a rotational motion transmission unit and a first motion conversion unit.
Figure 4B:
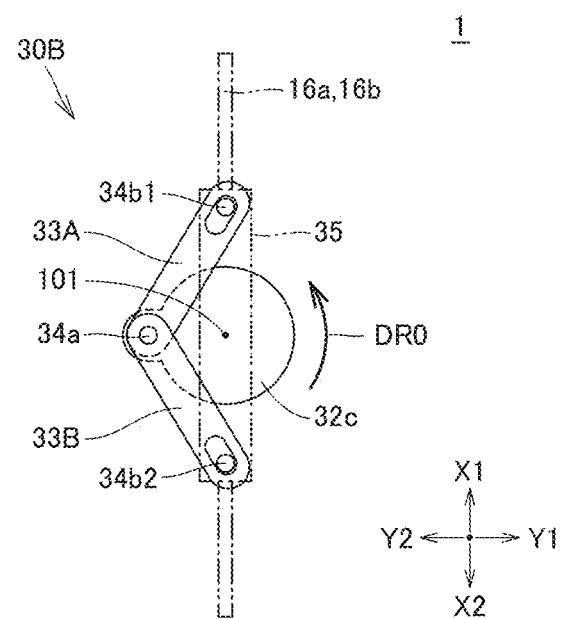
FIG. 4(B) shows the configuration of the first motion conversion unit.
Figure 5:
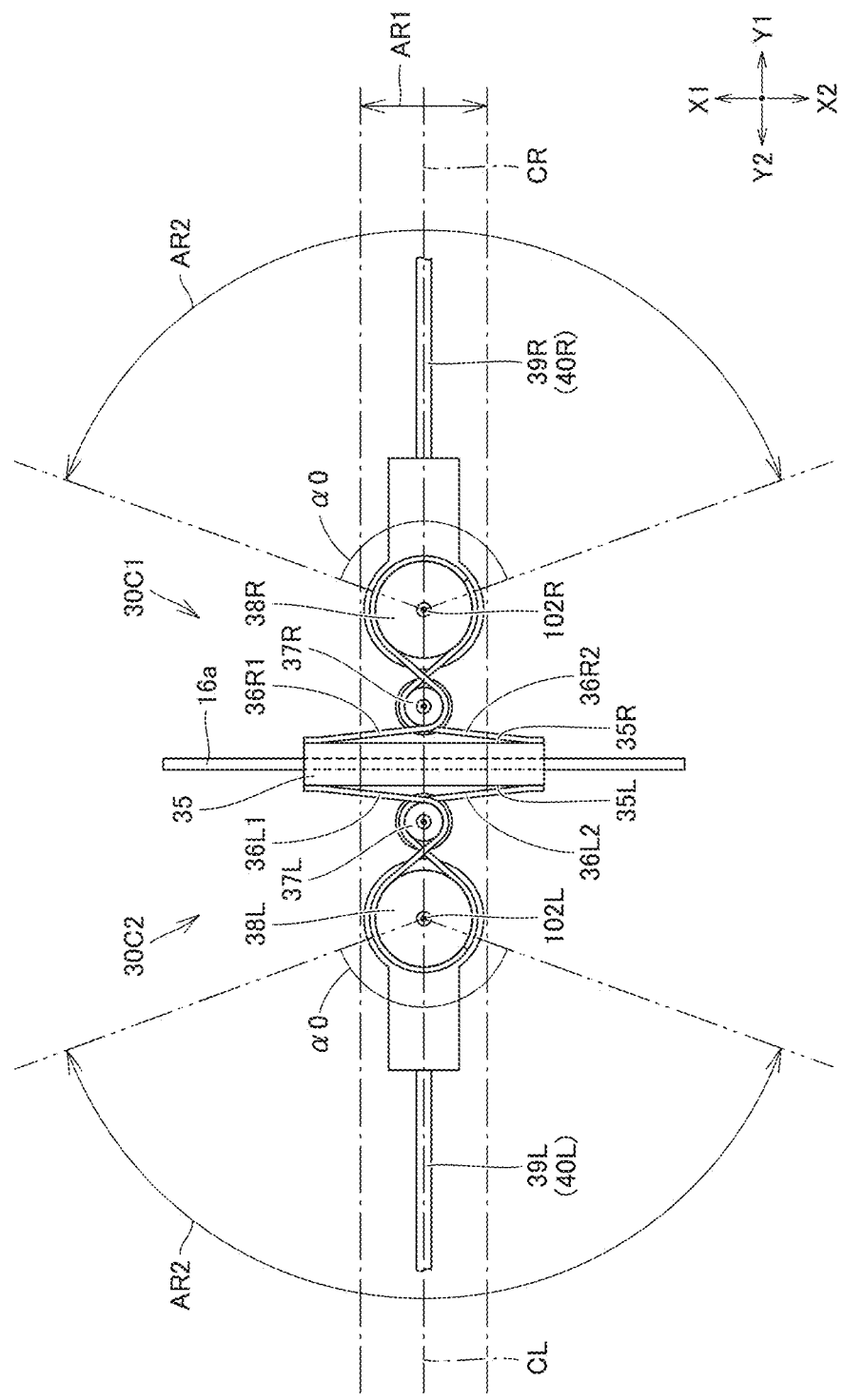
FIG. 5 is a plan view showing the configuration in the vicinity of a right-side second motion conversion unit and a left-side second motion conversion unit, and the behaviors of a right-side wing unit and a left-side wing unit during hovering.
Figure 6B:
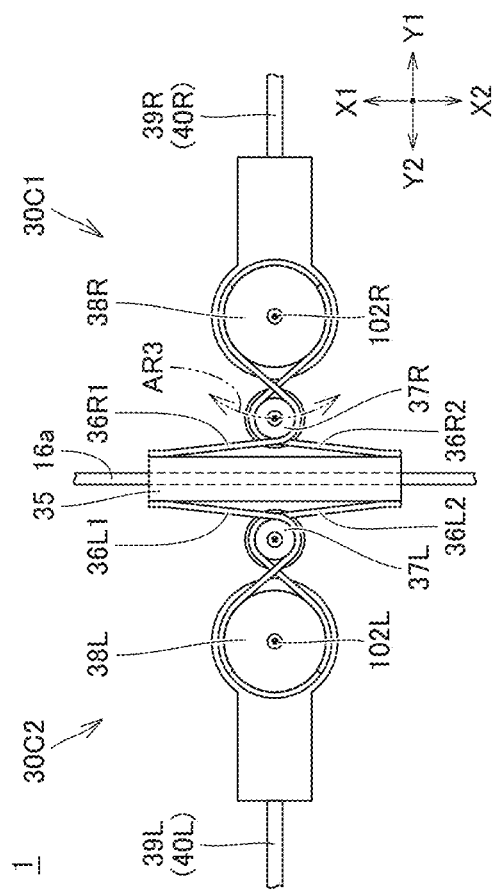
FIGS. 6(A) to 6(D) are diagrams showing the configuration of a right-side roller control mechanism, the movable range of a right-side roller, and the operation of the right-side roller control mechanism.
Figure 6D:
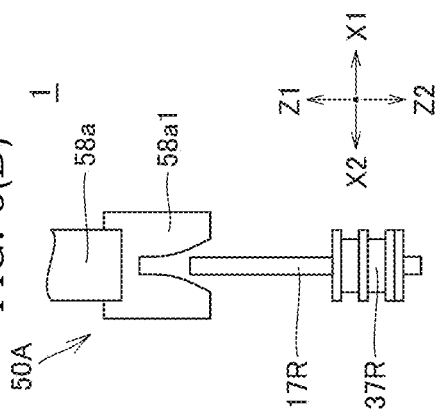
Figure 6C:
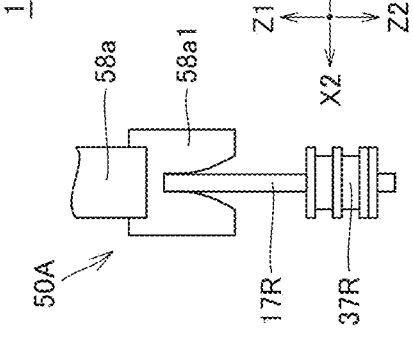
Figure 6A:
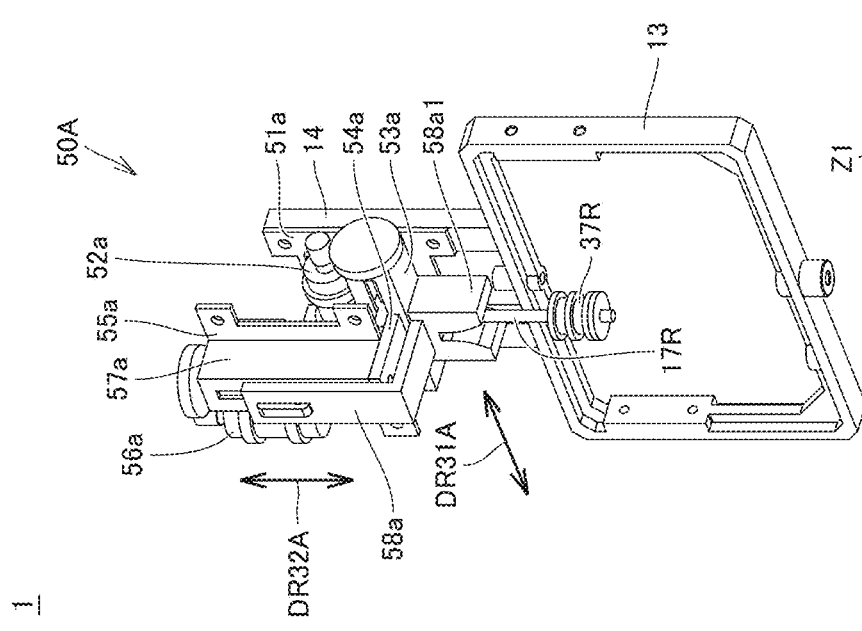

FIG. 1 is a schematic perspective view of a wing flapping apparatus 1 in an embodiment. FIG. 2 is a schematic perspective view of a main part of wing flapping apparatus 1. FIGS. 3(A) and 3(B) each are a perspective view of a power transmission mechanism 30. FIG. 4(A) is a side view showing the configuration in the vicinity of a rotational motion transmission unit 30A and a first motion conversion unit 30B. FIG. 4(B) is a plan view showing the configuration of a first motion conversion unit 30B. FIG. 5 is a plan view showing the configuration in the vicinity of a right-side second motion conversion unit 30C1 and a left-side second motion conversion unit 30C2, and the behaviors of a right-side wing unit 40R and a left-side wing unit 40L during hovering. FIGS. 6(A) and 6(B) respectively show a perspective view showing the configuration of a right-side roller control mechanism 50A and a plan view showing the movable range of a right-side roller 37R. FIGS. 6(C) and 6(D) each are a side view showing the operation of right-side roller control mechanism 50A. FIGS. 7(A) and 7(B) respectively show a perspective view showing the configuration of a left-side roller control mechanism 50B and a plan view showing the movable range of a left-side roller 37L. FIGS. 7(C) and 7(D) each are a side view showing the operation of left-side roller control mechanism 50B. First, referring to these FIGS. 1 to 7, the entire configuration of wing flapping apparatus 1 in the present embodiment will be described below.

As shown in FIG. 1, wing flapping apparatus 1 includes a framework 10; a main rotary motor 20 as a motive power source installed in framework 10; a power transmission mechanism 30 configured to transmit motive power generated in main rotary motor 20; a right-side wing unit 40R as the first wing unit and a left-side wing unit 40L as the second wing unit that are provided as a pair of wing units and driven by power transmission mechanism 30; a wing flapping control mechanism 50 for changing the wing flapping operations of right-side wing unit 40R and left-side wing unit 40L; and a battery (not shown) configured to supply electric power to the above-mentioned main rotary motor 20. Main rotary motor 20 and power transmission mechanism 30 form an actuator configured to input a swinging motion to right-side wing unit 40R and left-side wing unit 40L.

Moreover, as further shown in FIG. 1, the front-rear direction, the right-left direction, and the up-down direction of wing flapping apparatus 1 are defined as an X-axis, a Y-axis, and a Z-axis, respectively. The direction frontward of wing flapping apparatus 1 and the direction rearward of wing flapping apparatus 1 are defined as an X1 direction and an X2 direction, respectively. The direction rightward of wing flapping apparatus 1 and the direction leftward of wing flapping apparatus 1 are defined as a Y1 direction and a Y2 direction, respectively. The direction upward of wing flapping apparatus 1 and the direction downward of wing flapping apparatus 1 are defined as a Z1 direction and a Z2 direction, respectively. The following description will be made using these terms of axes and directions as defined above.

Referring to FIG. 2, the front-rear direction of wing flapping apparatus 1 in which the above-mentioned X-axis extends corresponds to the first direction in which a slider 35 (described later) linearly reciprocates. The up-down direction of wing flapping apparatus 1 in which the above-mentioned Z-axis extends corresponds to the second direction in which a second rotation axis 102R (described later) of a right-side rotating body 38R and a second rotation axis 102L (described later) of a left-side rotating body 38L (FIG. 5) extend. Furthermore, the right-left direction of wing flapping apparatus 1 in which the above-mentioned Y-axis extends corresponds to the third direction in which right-side rotating body 38R and left-side rotating body 38L (each of which will be described later) are arranged side by side.

(Configuration of Framework)

As shown in FIGS. 1 and 2, framework 10 is a member forming a main body portion of wing flapping apparatus 1. Also, main rotary motor 20, power transmission mechanism 30, wing flapping control mechanism 50, and a battery are installed in framework 10. Framework 10 is formed of a skeletal structure formed by combining a plurality of frame-shaped members. In addition, framework 10 may include a cover (not shown) for covering the skeletal structure.

Specifically, as shown in FIG. 2, framework 10 includes a lower frame 11 and an upper frame 12 as a pair of base frames each formed in an approximately flat plate shape; a support frame 13 formed in a rectangular frame shape; a pillar-shaped frame 14 extending in a rod shape; and a plurality of stems 15.

The plurality of stems 15 are disposed in parallel with each other so as to extend in the Z-axis direction. As shown in the figure, a total of four stems 15 are used in the present embodiment. These four stems 15 are disposed at the front right portion, the rear right portion, the front left portion, and the rear left portion in wing flapping apparatus 1.

Lower frame 11 and upper frame 12 are disposed across a plurality of stems 15, so that lower frame 11 and upper frame 12 are supported by the plurality of stems 15. These lower frame 11 and upper frame 12 are disposed at different positions in the Z-axis direction. More specifically, lower frame 11 is disposed approximately in the center portion of wing flapping apparatus 1 in the up-down direction while upper frame 12 is disposed close to the upper end portion of wing flapping apparatus 1 in the up-down direction.

Support frame 13 is disposed between lower frame 11 and upper frame 12. More specifically, support frame 13 is sandwiched between lower frame 11 and upper frame 12 in the Z-axis direction and fixed by these lower frame 11 and upper frame 12. Support frame 13 is disposed such that its opening faces provided as one pair are directed in the Y1 direction and the Y2 direction.

Pillar-shaped frame 14 is fixed to upper frame 12 and vertically arranged so as to extend upward from upper frame 12.

It is preferable that each of the above-mentioned plurality of stems 15 is formed of a rod-shaped member made of carbon fibers. Moreover, it is also preferable that each of lower frame 11, upper frame 12, support frame 13, and pillar-shaped frame 14 mentioned above is formed of a resin-made member. By the configuration as described above, wing flapping apparatus 1 can be reduced in weight while ensuring high rigidity. For the purpose of weight reduction, it is preferable that each of lower frame 11, upper frame 12, support frame 13, and pillar-shaped frame 14 is provided with holes, cutouts and the like while ensuring necessary rigidity.

(Configuration of Main Rotary Motor)

As shown in FIGS. 1 and 2, main rotary motor 20 is disposed in the lower portion of wing flapping apparatus 1 and fixed to lower frame 11 so as to be installed in framework 10. As shown in FIGS. 2 to 4, main rotary motor 20 includes an output shaft 20a (see FIG. 4(A)) configured to output a rotational motion. Output shaft 20a is disposed to extend in the Z-axis direction and has an end portion to which a gear 20b is fixed. Gear 20b rotates together with output shaft 20a in accordance with rotation of output shaft 20a about the axis line.

According to the exemplary aspect, the operation of main rotary motor 20 is controlled by a controller to which a control instruction is given by a user or an automated algorithm as would be appreciated to one skilled in the art. Specifically, the controller variably adjusts the electric power supplied from the above-mentioned battery (not shown) to main rotary motor 20, thereby controlling the output (that is, the rotation speed) of main rotary motor 20. In addition, since the above-mentioned control of the operation of main rotary motor 20 is a conventionally known and commonly used method, the detailed description thereof will not be herein given.

(Entire Configuration of Power Transmission Mechanism)

As shown in FIGS. 2 and 3, power transmission mechanism 30 includes: a rotational motion transmission unit 30A; a first motion conversion unit 30B; and a right-side second motion conversion unit 30C1 and a left-side second motion conversion unit 30C2 as a pair of second motion conversion units. Rotational motion transmission unit 30A serves as a power transmission unit configured to transmit the rotational motion generated in output shaft 20a of main rotary motor 20 as a rotational motion without being changed. First motion conversion unit 30B serves as a power transmission unit configured to convert the rotational motion transmitted from rotational motion transmission unit 30A into a reciprocating linear motion and transmit the converted motion. Right-side second motion conversion unit 30C1 is provided on the starboard side of wing flapping apparatus 1 and serves as a power transmission unit configured to convert the reciprocating linear motion transmitted from first motion conversion unit 30B into a reciprocating motion along the rotation direction and transmit the converted motion. Left-side second motion conversion unit 30C2 is provided on the port side of wing flapping apparatus 1 and serves as a power transmission unit configured to convert the reciprocating linear motion transmitted from first motion conversion unit 30B into a reciprocating motion along the rotation direction and transmit the converted motion.

(Configuration of Rotational Motion Transmission Unit)

As shown in FIGS. 2 to 4, rotational motion transmission unit 30A includes a first transmission member 31 and a second transmission member 32. First transmission member 31 and second transmission member 32 each are rotatably supported by support frame 13 so as to be installed in framework 10.

First transmission member 31 includes a first connection rod 31a extending in the Z-axis direction, a gear 31b fixed to one end of first connection rod 31a, and a gear 31c fixed to the other end of first connection rod 31a. Each of gear 31b and gear 31c rotates, together with first connection rod 31a, about the axis line of first connection rod 31a.

Second transmission member 32 includes a second connection rod 32a extending in the Z-axis direction, a gear 32b fixed at a prescribed position of second connection rod 32a, and a disk 32c serving as a rotation transmission member and fixed at a prescribed position of second connection rod 32a. Each of gear 32b and disk 32c rotates, together with second connection rod 32a, about the axis line of second connection rod 32a.

Gear 31b fixed to one end of first connection rod 31a engages with gear 20b fixed to the end portion of output shaft 20a. Furthermore, gear 32b fixed at a prescribed position of second connection rod 32a engages with gear 31c fixed to the other end of first connection rod 31a.

Thus, the rotational motion produced in output shaft 20a of main rotary motor 20 is transmitted, as a rotational motion without being changed, to first transmission member 31 and second transmission member 32. Consequently, disk 32c serving as a rotation transmission member that is an output unit of rotational motion transmission unit 30A undergoes a rotational motion about the axis line of second connection rod 32a. In other words, disk 32c rotates about a first rotation axis 101 (see FIG. 4(B)) as the center of rotation, which extends in the direction parallel to the extending direction of second connection rod 32a (that is, in the Z-axis direction). Also, by adjusting the number of teeth of each of gears 31b, 31c and 32b, first transmission member 31 and second transmission member 32 function as reduction gears.

(Configuration of First Motion Conversion Unit)

As shown in FIGS. 2 to 4(A) and 4(B), first motion conversion unit 30B is disposed above main rotary motor 20 and rotational motion transmission unit 30A, and includes a crank mechanism formed of a first crank arm 33A, a second crank arm 33B and crank pins 34a, 34b1, 34b2 (see FIG. 4(A)); and a slider 35.

Slider 35 has an approximately flat plate shape having outer dimensions in the Y-axis direction that are smaller than each of the outer dimensions in the X-axis direction and the outer dimensions in the Z-axis direction. Also, slider 35 is located above second transmission member 32 of rotational motion transmission unit 30A. Slider 35 is movably supported by framework 10.

More specifically, slider 35 is movably supported by a pair of slide guides 16a and 16b provided in support frame 13. Slide guides 16a and 16b are supported by support frame 13 so as to extend in the X-axis direction and to be arranged side by side in the Z-axis direction. At prescribed positions, slider 35 has a plurality of through holes through which slide guides 16a and 16b are inserted. Thus, slide guides 16a and 16b are inserted through the plurality of through holes, so that slider 35 is guided by the pair of slide guides 16a and 16b in the X-axis direction corresponding to the first direction.

In this case, slider 35 and the pair of slide guides 16a and 16b are disposed inside support frame 13. In other words, support frame 13 surrounds slider 35 and the pair of slide guides 16a and 16b in the X-axis direction and the Z-axis direction. By the configuration as described above, the portion of power transmission mechanism 30 in which slider 35 is disposed can be entirely reduced in thickness, so that wing flapping apparatus 1 can be reduced in size. For the purpose of weight reduction, it is preferable that slider 35 is provided with holes, cutouts and the like while ensuring necessary rigidity.

The crank mechanism including first crank arm 33A and second crank arm 33B is disposed below slider 35 and above second transmission member 32. More specifically, the crank mechanism is disposed adjacent to slider 35 in the Z-axis direction so as to extend across a part of the space surrounded by support frame 13 in the Y-axis direction. First crank arm 33A and second crank arm 33B each are disposed so as to extend in the direction parallel to an X-Y plane.

As shown in FIG. 4(B), first crank arm 33A has one end that is rotatably attached by crank pin 34a to the eccentric position of disk 32c of second transmission member 32; and the other end that is rotatably attached by crank pin 34b1 to the front end position of slider 35. Second crank arm 33B has: one end that is rotatably attached by crank pin 34a to the eccentric position of disk 32c of second transmission member 32; and the other end that is rotatably attached by crank pin 34b2 to the rear end position of slider 35.

In this case, the above-mentioned one end of first crank arm 33A and the above-mentioned one end of second crank arm 33B are rotatably attached by common crank pin 34a to disk 32c, as described above. Thus, the one end of first crank arm 33A and the one end of second crank arm 33B each are rotatably connected at the eccentric position of disk 32c about the common rotation axis as the center of rotation, the common rotation axis extending in the direction parallel to the extending direction (that is, the Z-axis direction) of first rotation axis 101 of disk 32c.

On the other hand, as described above, the above-mentioned other end of first crank arm 33A and the above-mentioned other end of second crank arm 33B are rotatably attached to slider 35 by separate crank pins 34b1 and 34b2, respectively. Accordingly, the other end of first crank arm 33A and the other end of second crank arm 33B are connected to slider 35 so as to be rotatable about separate rotation axes each as the center of rotation. These separate rotation axes extend in the direction parallel to the extending direction (that is, the Z-axis direction) of first rotation axis 101 of disk 32c, and also are spaced apart from each other in the X-axis direction corresponding to the direction in which slider 35 moves.

Thus, as shown in FIG. 4(B), disk 32c serving as a rotation transmission member that is an output unit of rotational motion transmission unit 30A undergoes a rotational motion about first rotation axis 101 as the center of rotation in the direction indicated by an arrow DR0 shown in the figure, so that the one ends of first crank arm 33A and second crank arm 33B that are attached to disk 32c (that is, the end portions of the crank arms on the side where crank pin 34a is located) each also rotate about first rotation axis 101 as the center of rotation in the direction indicated by an arrow DR0. Accordingly, slider 35 as an output unit of first motion conversion unit 30B is cyclically pushed and pulled by first crank arm 33A and second crank arm 33B, so that slider 35 linearly reciprocates in the X-axis direction corresponding to the direction in which slide guides 16a and 16b extend.

As shown in FIGS. 2 to 4, slider 35 is provided with a front-side elastic body 60A as the first biasing portion and a rear-side elastic body 60B as the second biasing portion each serving as an elasticity applying mechanism.

(Configuration of Right-Side Second Motion Conversion Unit)

As shown in FIGS. 2, 3 and 5, right-side second motion conversion unit 30C1 is disposed on the right side of slider 35, and includes a front right-side elastic belt 36R1 and a rear right-side elastic belt 36R2 each as the first elastic belt; a right-side roller 37R as the first hanger unit; and a right-side rotating body 38R as the first rotating body.

Right-side rotating body 38R is formed in an approximately solid-cylindrical shape and rotatably supported by framework 10. More specifically, right-side rotating body 38R is fixed to lower frame 11 and upper frame 12, so that right-side rotating body 38R is rotatably attached to right-side guide shaft 18R extending in the Z-axis direction. Thereby, right-side rotating body 38R is disposed such that its circumferential surface faces a right-side surface 35R of slider 35. Also, right-side rotating body 38R is supported so as to be rotatable about second rotation axis 102R (see FIG. 5), as the center of rotation, extending in the direction parallel to the extending direction (that is, the Z-axis direction) of right-side guide shaft 18R.

Front right-side elastic belt 36R1 and rear right-side elastic belt 36R2 each are hung over slider 35 and right-side rotating body 38R. More specifically, front right-side elastic belt 36R1 has: one end fixed to the front end portion of right-side surface 35R of slider 35; and the other end, as a portion not fixed to slider 35, fixed to a prescribed position on the circumferential surface of right-side rotating body 38R. Furthermore, rear right-side elastic belt 36R2 has: one end fixed to the rear end portion of right-side surface 35R of slider 35; and the other end, as a portion not fixed to slider 35, fixed to a prescribed position on the circumferential surface of right-side rotating body 38R.

In this case, front right-side elastic belt 36R1 and rear right-side elastic belt 36R2 are disposed at positions displaced from each other in the Z-axis direction. More specifically, front right-side elastic belt 36R1 is disposed above rear right-side elastic belt 36R2 while rear right-side elastic belt 36R2 is disposed below front right-side elastic belt 36R1. Thereby, without interfering with each other, front right-side elastic belt 36R1 and rear right-side elastic belt 36R2 independently connect slider 35 and right-side rotating body 38R.

Front right-side elastic belt 36R1 and rear right-side elastic belt 36R2 each are provided as a member for transmitting motive power from slider 35 to right-side rotating body 38R and are formed of a resin-made or rubber-made member having proper elasticity. By forming front right-side elastic belt 36R1 and rear right-side elastic belt 36R2 using such a member having proper elasticity, the load applied to main rotary motor 20 by the wing flapping operation of right-side wing unit 40R is absorbed correspondingly by expansion and contraction of front right-side elastic belt 36R1 and rear right-side elastic belt 36R2. Thereby, fluctuations of the load can be suppressed, so that the motion efficiency of wing flapping apparatus 1 is improved.

Right-side roller 37R is disposed between slider 35 and right-side rotating body 38R and supported such that it can be rotatably moved by framework 10 about the above-mentioned second rotation axis 102R of right-side rotating body 38R as the center of rotation. Specifically, a right-side upper arm 19R1 and a right-side lower arm 19R2 as a pair of arms are attached to right-side guide shaft 18R rotatably supporting the above-mentioned right-side rotating body 38R, such that right-side upper arm 19R1 and right-side lower arm 19R2 are rotatable relative to right-side guide shaft 18R. By being fixed to right-side upper arm 19R1 and right-side lower arm 19R2, right-side roller shaft 17R extends in the Z-axis direction. Right-side roller 37R is rotatably attached to right-side roller shaft 17R.

Each of front right-side elastic belt 36R1 and rear right-side elastic belt 36R2 has a portion that is located between slider 35 and right-side rotating body 38R and that is hung over right-side roller 37R. In other words, right-side roller 37R is in contact with front right-side elastic belt 36R1 and rear right-side elastic belt 36R2 so as to apply a prescribed amount of tensile force to front right-side elastic belt 36R1 and rear right-side elastic belt 36R2.

In this case, in a view seen in the Z-axis direction, each of front right-side elastic belt 36R1 and rear right-side elastic belt 36R2 is hung over slider 35, right-side roller 37R and right-side rotating body 38R so as to extend in an S-shape. Thus, front right-side elastic belt 36R1 and rear right-side elastic belt 36R2 cross each other so as to overlap with each other at the position between slider 35 and right-side roller 37R, and at the position between right-side roller 37R and right-side rotating body 38R. Thereby, right-side roller 37R is sandwiched between front right-side elastic belt 36R1 and rear right-side elastic belt 36R2.

Thus, as slider 35 linearly reciprocates in the X-axis direction as described above, the portions of front right-side elastic belt 36R1 and rear right-side elastic belt 36R2 that are fixed to right-side rotating body 38R each are fed in the direction in which right-side rotating body 38R rotates. This causes right-side rotating body 38R as an output unit of right-side second motion conversion unit 30C1 to reciprocate in the rotation direction about the above-mentioned second rotation axis 102R as the center of rotation.

As described above, each of front right-side elastic belt 36R1 and rear right-side elastic belt 36R2 is hung over right-side roller 37R, so that various types of flying manners can be implemented.

In this case, in the present embodiment, each of front right-side elastic belt 36R1 and rear right-side elastic belt 36R2 is formed as a friction belt not having teeth while each of right-side roller 37R and right-side rotating body 38R is formed as a friction roller not having teeth, each of which however does not necessarily have to be configured in this way. Instead, each of front right-side elastic belt 36R1 and rear right-side elastic belt 36R2 may be formed as a toothed belt while each of right-side roller 37R and right-side rotating body 38R may be formed as a toothed roller (gear).

Also in the present embodiment, slider 35 and right-side rotating body 38R are connected using two elastic belts including front right-side elastic belt 36R1 and rear right-side elastic belt 36R2, but may be connected using one elastic belt. In this case, one end of one elastic belt may be fixed to the front end portion of slider 35 and the other end of this one elastic belt may be fixed to the rear end portion of slider 35. Then, the portion of this one elastic belt that is not fixed to slider 35 may be wound around or fixed to right-side rotating body 38R.

(Configuration of Left-Side Second Motion Conversion Unit)

As shown in FIGS. 2, 3 and 5, left-side second motion conversion unit 30C2 is disposed on the left side of slider 35 and mainly includes: a front left-side elastic belt 36L1 and a rear left-side elastic belt 36L2 each as the second elastic belt; a left-side roller 37L as the second hanger unit; and a left-side rotating body 38L as the second rotating body.

Left-side rotating body 38L is formed in an approximately solid-cylindrical shape and rotatably supported by framework 10. More specifically, left-side rotating body 38L is fixed to lower frame 11 and upper frame 12, so that left-side rotating body 38L is rotatably attached to left-side guide shaft 18L extending in the Z-axis direction. Thereby, left-side rotating body 38L is disposed such that its circumferential surface faces a left-side surface 35L of slider 35. Also, left-side rotating body 38L is supported so as to be rotatable about second rotation axis 102L (see FIG. 5), as the center of rotation, extending in the direction parallel to the extending direction (that is, the Z-axis direction) of left-side guide shaft 18L.

Front left-side elastic belt 36L1 and rear left-side elastic belt 36L2 are hung over slider 35 and left-side rotating body 38L. More specifically, front left-side elastic belt 36L1 has: one end fixed to the front end portion of left-side surface 35L of slider 35; and the other end, as a portion not fixed to slider 35, fixed to a prescribed position on the circumferential surface of left-side rotating body 38L. Furthermore, rear left-side elastic belt 36L2 has: one end fixed to the rear end portion of left-side surface 35L of slider 35; and the other end, as a portion not fixed to slider 35, fixed to a prescribed position on the circumferential surface of left-side rotating body 38L.

In this case, front left-side elastic belt 36L1 and rear left-side elastic belt 36L2 are disposed at positions displaced from each other in the Z-axis direction. More specifically, front left-side elastic belt 36L1 is disposed above rear left-side elastic belt 36L2 while rear left-side elastic belt 36L2 is disposed below front left-side elastic belt 36L1. Thereby, without interfering with each other, front left-side elastic belt 36L1 and rear left-side elastic belt 36L2 independently connect slider 35 and left-side rotating body 38L.

Front left-side elastic belt 36L1 and rear left-side elastic belt 36L2 each are provided as a member for transmitting motive power from slider 35 to left-side rotating body 38L and formed of a resin-made or rubber-made member having proper elasticity. By forming front left-side elastic belt 36L1 and rear left-side elastic belt 36L2 using such a member having proper elasticity, the load applied to main rotary motor 20 by the wing flapping operation of left-side wing unit 40L is absorbed correspondingly by expansion and contraction of front left-side elastic belt 36L1 and rear left-side elastic belt 36L2. Thereby, fluctuations of the load can be suppressed, so that the motion efficiency of wing flapping apparatus 1 can be improved.

Left-side roller 37L is disposed between slider 35 and left-side rotating body 38L and supported such that it can be rotatably moved by framework 10 about the above-mentioned second rotation axis 102L of left-side rotating body 38L as the center of rotation. Specifically, a left-side upper arm 19L1 and a left-side lower arm 19L2 as a pair of arms are attached to left-side guide shaft 18L rotatably supporting the above-mentioned left-side rotating body 38L, such that left-side upper arm 19L1 and left-side lower arm 19L2 are rotatable relative to left-side guide shaft 18L. By being fixed to left-side upper arm 19L1 and left-side lower arm 19L2, left-side roller shaft 17L extends in the Z-axis direction. Left-side roller 37L is rotatably attached to left-side roller shaft 17L.

Each of front left-side elastic belt 36L1 and rear left-side elastic belt 36L2 has a portion that is located between slider 35 and left-side rotating body 38L and that is hung over left-side roller 37L. In other words, left-side roller 37L is in contact with front left-side elastic belt 36L1 and rear left-side elastic belt 36L2 so as to apply a prescribed amount of tensile force to front left-side elastic belt 36L1 and rear left-side elastic belt 36L2.

In this case, in a view seen in the Z-axis direction, each of front left-side elastic belt 36L1 and rear left-side elastic belt 36L2 is hung over slider 35, left-side roller 37L and left-side rotating body 38L so as to extend in an S-shape. Thus, front left-side elastic belt 36L1 and rear left-side elastic belt 36L2 cross each other so as to overlap with each other at the position between slider 35 and left-side roller 37L, and at the position between left-side roller 37L and left-side rotating body 38L. Thereby, left-side roller 37L is sandwiched between front left-side elastic belt 36L1 and rear left-side elastic belt 36L2.

Thus, as slider 35 linearly reciprocates in the X-axis direction as described above, the portions of front left-side elastic belt 36L1 and rear left-side elastic belt 36L2 that are fixed to left-side rotating body 38L each are fed in the direction in which left-side rotating body 38L rotates. This causes left-side rotating body 38L as an output unit of left-side second motion conversion unit 30C2 to reciprocate in the rotation direction about the above-mentioned second rotation axis 102L as the center of rotation.

As described above, each of front left-side elastic belt 36L1 and rear left-side elastic belt 36L2 is hung over left-side roller 37L, so that various types of flying manners can be implemented.

In this case, in the present embodiment, each of front left-side elastic belt 36L1 and rear left-side elastic belt 36L2 is formed as a friction belt not having teeth while each of left-side roller 37L and left-side rotating body 38L is formed as a friction roller not having teeth, each of which however does not necessarily have to be configured in this way. Instead, each of front left-side elastic belt 36L1 and rear left-side elastic belt 36L2 may be formed as a toothed belt while each of left-side roller 37L and left-side rotating body 38L may be formed as a toothed roller (gear).

Also in the present embodiment, slider 35 and left-side rotating body 38L are connected using two elastic belts including front left-side elastic belt 36L1 and rear left-side elastic belt 36L2, but may be connected using one elastic belt. In this case, one end of one elastic belt may be fixed to the front end portion of slider 35 and the other end of this one elastic belt may be fixed to the rear end portion of slider 35. Then, the portion of this one elastic belt that is not fixed to slider 35 may be wound around or fixed to left-side rotating body 38L.

(Summary of Power Transmission Mechanism)

By power transmission mechanism 30 as having been described above, the motive power of main rotary motor 20 is to be distributed and transmitted to right-side rotating body 38R and left-side rotating body 38L, thereby causing right-side rotating body 38R and left-side rotating body 38L to synchronously reciprocate in the rotation direction about second rotation axis 102R and second rotation axis 102L, respectively, each as the center of rotation.

(Configuration of Right-Side Wing Unit and Left-Side Wing Unit)

As shown in FIGS. 1, 2 and 5, right-side wing unit 40R and left-side wing unit 40L are attached to a right-side mast 39R and a left-side mast 39L, respectively, each of which extends in a rod shape. More specifically, right-side wing unit 40R has an upper edge portion fixed to right-side mast 39R while left-side wing unit 40L has an upper edge portion fixed to left-side mast 39L.

In this case, as described above, right-side rotating body 38R and left-side rotating body 38L are disposed on the right side and the left side, respectively, of slider 35. More specifically, right-side rotating body 38R and left-side rotating body 38L are arranged side by side in the Y-axis direction so as to sandwich slider 35 therebetween.

The above-mentioned right-side mast 39R and left-side mast 39L are attached to right-side rotating body 38R and left-side rotating body 38L, respectively, that are arranged side by side in the Y-axis direction. Thus, right-side wing unit 40R and left-side wing unit 40L are located on the starboard side and the port side, respectively, of wing flapping apparatus 1.

More specifically, the base end as one end of right-side mast 39R is fixed to the end portion of right-side rotating body 38R on the opposite side of slider 35 while the base end as one end of left-side mast 39L is fixed to the end portion of left-side rotating body 38L on the opposite side of slider 35. Thus, right-side wing unit 40R extends in the Y1 direction such that its leading end is located on the opposite side of left-side rotating body 38L with respect to right-side rotating body 38R. Also, left-side wing unit 40L extends in the Y2 direction such that its leading end is located on the opposite side of right-side rotating body 38R with respect to left-side rotating body 38L.

Thus, as shown in FIG. 5, right-side rotating body 38R and left-side rotating body 38L synchronously reciprocate in their respective rotation directions about second rotation axis 102R and second rotation axis 102L, respectively, each as the center of rotation, so that right-side mast 39R and left-side mast 39L are driven by right-side rotating body 38R and left-side rotating body 38L, respectively, so as to synchronously swing.

In this case, right-side wing unit 40R and left-side wing unit 40L also synchronously reciprocate in their respective rotation directions about the above-mentioned second rotation axis 102R and second rotation axis 102L, respectively, each as the center of rotation. Accordingly, right-side wing unit 40R and left-side wing unit 40L synchronously swing such that their respective leading ends move approximately in the X-axis direction.

In FIG. 5, the moving range of the position of the center of gravity of slider 35 during its linear reciprocation is indicated by an arrow AR1 while the swinging ranges of right-side wing unit 40R and left-side wing unit 40L are indicated by respective arrows AR2. In addition, in the moving range of slider 35, the position at which slider 35 is located most forward is defined as the first position while the position at which slider 35 is located most rearward is defined as the second position. In the following description, these terms of the first position and the second position will be also used.

(Entire Configuration of Wing Flapping Control Mechanism)

As shown in FIG. 2, wing flapping control mechanism 50 includes right-side roller control mechanism 50A for changing the wing flapping operation of right-side wing unit 40R and left-side roller control mechanism 50B for changing the wing flapping operation of left-side wing unit 40L.

(Configuration of Right-Side Roller Control Mechanism)

As shown in FIGS. 2 and 6, right-side roller control mechanism 50A is disposed on the starboard side of wing flapping apparatus 1 on which right-side roller 37R is located. Also, right-side roller control mechanism 50A is formed of various types of components attached to pillar-shaped frame 14. Right-side roller control mechanism 50A variably adjusts the position of right-side roller 37R and also variably adjusts the degree of axis deflection of right-side roller 37R.

Specifically, right-side roller control mechanism 50A includes: a first stage 51a fixed to pillar-shaped frame 14; a first sub-rotary motor 52a and a first feed mechanism unit 53a that are attached to first stage 51a; a coupling member 54a attached to first feed mechanism unit 53a; a second stage 55a fixed to coupling member 54a; a second sub-rotary motor 56a and a second feed mechanism unit 57a that are attached to second stage 55a; and a guide member 58a attached to second feed mechanism unit 57a.

First sub-rotary motor 52a has a rotation shaft to which a pinion gear is attached. First feed mechanism unit 53a includes: a gearbox provided with a slit; a worm gear rotatably supported by the gearbox; a spur gear attached to the end portion of the worm gear; and a movable body having a nut portion engaging with the worm gear. The worm gear is disposed such that its axis direction extends in parallel to the X-axis direction.

The pinion gear attached to the rotation shaft of first sub-rotary motor 52a engages with the spur gear attached to the end portion of the worm gear. Thereby, the worm gear rotates as the rotation shaft of first sub-rotary motor 52a rotates. The movable body is disposed so as to be partially inserted into the slit provided in the gearbox. Thus, the movable body is moved in the axis direction (that is, the X-axis direction) of the worm gear as the worm gear rotates.

Second sub-rotary motor 56a has a rotation shaft to which a pinion gear is attached. Second feed mechanism unit 57a includes: a gearbox provided with a slit; a worm gear rotatably supported by the gearbox; a spur gear attached to the end portion of the worm gear; and a movable body having a nut portion engaging with the worm gear. The worm gear is disposed such that its axis direction extends in parallel to the Z-axis direction.

The pinion gear attached to the rotation shaft of second sub-rotary motor 56a engages with the spur gear attached to the end portion of the worm gear. Thereby, the worm gear rotates as the rotation shaft of second sub-rotary motor 56a rotates. The movable body is disposed so as to be partially inserted into the slit provided in the gearbox. Thus, the movable body is moved in the axis direction (that is, the Z-axis direction) of the worm gear as the worm gear rotates.

Guide member 58a has a lower end provided with a guide portion 58a1. Guide portion 58a1 has a lower surface on which a groove extending in the Y-axis direction is provided. The distance between a pair of wall portions defining this groove of guide portion 58a1 varies in the Z-axis direction. More specifically, the distance between the paired wall portions is gradually reduced upward.

The upper end of right-side roller shaft 17R rotatably supporting right-side roller 37R is accommodated in the groove. Thereby, the upper end of right-side roller shaft 17R is sandwiched between the paired wall portions of guide portion 58a1 in the X-axis direction.

As described above, coupling member 54a is attached to first feed mechanism unit 53a. More specifically, coupling member 54a has one end fixed to the movable body of first feed mechanism unit 53a and the other end fixed to second stage 55a, as described above. Also as described above, guide member 58a is attached to second feed mechanism unit 57a. More specifically, guide member 58a has an upper end fixed to the movable body of second feed mechanism unit 57a and a lower end provided with the above-mentioned guide portion 58a1.

Thus, as first sub-rotary motor 52a is driven, guide portion 58a1 of guide member 58a is moved in the direction indicated by an arrow DR31A (see FIG. 6(A)) in the X-axis direction parallel to the axis direction of the worm gear of first feed mechanism unit 53a. Also, as second sub-rotary motor 56a is driven, guide portion 58a1 of guide member 58a is moved in the direction indicated by an arrow DR32A (see FIG. 6(A)) in the Z-axis direction parallel to the axis direction of the worm gear of second feed mechanism unit 57a.

Then, referring to FIG. 6(A), as first sub-rotary motor 52a is driven, guide portion 58a1 is moved in the direction indicated by arrow DR31A, so that the above-mentioned paired wall portions defining the groove of guide portion 58a1 are brought into contact with the upper end of right-side roller shaft 17R. Thereby, right-side roller shaft 17R is moved.

In this case, referring to FIGS. 2 and 3, as described above, right-side roller shaft 17R is rotatably attached to right-side guide shaft 18R through right-side upper arm 19R1 and right-side lower arm 19R2. Thus, right-side roller shaft 17R is to be moved so as to rotate about second rotation shaft 102R of right-side rotating body 38R as the center of rotation. As a result, as shown in FIG. 6(B), right-side roller 37R is moved so as to rotate in the direction indicated by an arrow AR3 shown in the figure about second rotation shaft 102R of right-side rotating body 38R as the center of rotation.

In other words, among the above-mentioned various types of components forming right-side roller control mechanism 50A, particularly first sub-rotary motor 52a and first feed mechanism unit 53a function as a hanger unit position adjustment mechanism for variably adjusting the position of right-side roller 37R.

On the other hand, referring to FIG. 6(A), second sub-rotary motor 56a is driven to move guide portion 58a1 in the direction indicated by arrow DR32A, thereby changing the amount of insertion of the upper end of right-side roller shaft 17R into the groove of guide portion 58a1. In this case, as described above, the distance between the paired wall portions defining the groove of guide portion 58a1 varies in the Z-axis direction. Accordingly, as the amount of insertion of the upper end of right-side roller shaft 17R into the groove of guide portion 58a1 changes, the distance between the paired wall portions and the upper end of right-side roller shaft 17R also changes.

Accordingly, the state of contact of guide portion 58a1 with right-side roller shaft 17R is changed, thereby changing the state of restraint of right-side roller shaft 17R by guide member 58a. As a result, the axis deflection occurring in right-side roller shaft 17R (that is, the axis deflection occurring in right-side roller 37R) is variably adjusted.

In other words, among the above-mentioned various types of components forming right-side roller control mechanism 50A, guide member 58a corresponds to a restriction portion for restricting the axis deflection of right-side roller 37R. Also, among the above-mentioned various types of components forming right-side roller control mechanism 50A, particularly second sub-rotary motor 56a and second feed mechanism unit 57a function as an axis deflection adjustment mechanism for variably adjusting the magnitude of the axis deflection of right-side roller 37R.

(Configuration of Left-Side Second Motion Conversion Unit)

As shown in FIGS. 2 and 7, left-side roller control mechanism 50B is disposed on the port side of wing flapping apparatus 1 on which left-side roller 37L is located. Also, left-side roller control mechanism 50B is formed of various types of components attached to pillar-shaped frame 14. Left-side roller control mechanism 50B variably adjusts the position of left-side roller 37L and variably adjusts the degree of the axis deflection of left-side roller 37L.

Specifically, left-side roller control mechanism 50B includes: a first stage 51b fixed to pillar-shaped frame 14; a first sub-rotary motor 52b and a first feed mechanism unit 53b that are attached to first stage 51b; a coupling member 54b attached to first feed mechanism unit 53b; a second stage 55b fixed to coupling member 54b; a second sub-rotary motor 56b and a second feed mechanism unit 57b that are attached to second stage 55b; and a guide member 58b attached to second feed mechanism unit 57b.

First sub-rotary motor 52b has a rotation shaft to which a pinion gear is attached. First feed mechanism unit 53b includes a gearbox provided with a slit; a worm gear rotatably supported by the gearbox; a spur gear attached to the end portion of the worm gear; and a movable body having a nut portion engaging with the worm gear. The worm gear is disposed such that its axis direction extends in parallel to the X-axis direction.

The pinion gear attached to the rotation shaft of first sub-rotary motor 52b engages with the spur gear attached to the end portion of the worm gear. Thus, the worm gear rotates as the rotation shaft of first sub-rotary motor 52b rotates. The movable body is disposed so as to be partially inserted into the slit provided in the gearbox. Thus, the movable body is moved in the axis direction (that is, the X-axis direction) of the worm gear as the worm gear rotates.

Second sub-rotary motor 56b has a rotation shaft to which a pinion gear is attached. Second feed mechanism unit 57b includes a gearbox provided with a slit; a worm gear rotatably supported by the gearbox; a spur gear attached to the end portion of the worm gear; and a movable body having a nut portion engaging with the worm gear. The worm gear is disposed such that its axis direction extends in parallel to the Z-axis direction.

The pinion gear attached to the rotation shaft of second sub-rotary motor 56b engages with the spur gear attached to the end portion of the worm gear. Thus, the worm gear rotates as the rotation shaft of second sub-rotary motor 56b rotates. The movable body is disposed so as to be partially inserted into the slit provided in the gearbox. Thus, the movable body is moved in the axis direction (that is, the Z-axis direction) of the worm gear as the worm gear rotates.

Guide member 58b has a lower end provided with a guide portion 58b1. Guide portion 58b1 has a lower surface on which a groove extending in the Y-axis direction is provided. The distance between a pair of wall portions defining the groove of guide portion 58b1 varies in the Z-axis direction. More specifically, the distance between the paired wall portions is gradually reduced upward.

The upper end of left-side roller shaft 17L rotatably supporting left-side roller 37L is accommodated in the groove. Thereby, the upper end of left-side roller shaft 17L is sandwiched between the paired wall portions of guide portion 58b1 in the X-axis direction.

As described above, coupling member 54b is attached to first feed mechanism unit 53b. More specifically, coupling member 54b has one end fixed to the movable body of first feed mechanism unit 53b and the other end fixed to second stage 55b, as described above. Also as described above, guide member 58b is attached to second feed mechanism unit 57b. More specifically, guide member 58b has an upper end fixed to the movable body of second feed mechanism unit 57b and a lower end provided with the above-mentioned guide portion 58b1.

As described above, as first sub-rotary motor 52b is driven, guide portion 58b1 of guide member 58b is moved in the direction indicated by an arrow DR31B (see FIG. 7(A)) in the X-axis direction parallel to the axis direction of the worm gear of first feed mechanism unit 53b. Also, as second sub-rotary motor 56b is driven, guide portion 58b1 of guide member 58b is moved in the direction indicated by an arrow DR32B (see FIG. 7(A)) in the Z-axis direction parallel to the axis direction of the worm gear of second feed mechanism unit 57b.

Then, referring to FIG. 7(A), as first sub-rotary motor 52b is driven, guide portion 58a1 is moved in the direction indicated by arrow DR31B, so that the above-mentioned paired wall portions defining the groove of guide portion 58b1 are brought into contact with the upper end of left-side roller shaft 17L. Thereby, left-side roller shaft 17L is moved.

In this case, referring to FIGS. 2 and 3, as described above, left-side roller shaft 17L is rotatably attached to left-side guide shaft 18L through left-side upper arm 19L1 and left-side lower arm 19L2. Thus, left-side roller shaft 17L is to be moved so as to rotate about second rotation shaft 102L of left-side rotating body 38L as the center of rotation. As a result, as shown in FIG. 7(B), left-side roller 37L is moved so as to rotate in the direction indicated by an arrow AR3 shown in the figure about second rotation shaft 102L of left-side rotating body 38L as the center of rotation.

In other words, among the above-mentioned various types of components forming left-side roller control mechanism 50B, particularly first sub-rotary motor 52b and first feed mechanism unit 53b function as a hanger unit position adjustment mechanism for variably adjusting the position of left-side roller 37L.

On the other hand, referring to FIG. 7(A), as second sub-rotary motor 56b is driven, guide portion 58b1 is moved in the direction indicated by arrow DR32B, thereby changing the amount of insertion of the upper end of left-side roller shaft 17L into the groove of guide portion 58b1. In this case, as described above, the distance between the paired wall portions defining the groove of guide portion 58b1 varies in the Z-axis direction. Accordingly, as the amount of insertion of the upper end of left-side roller shaft 17L into the groove of guide portion 58b1 changes, the distance between the paired wall portions and the upper end of left-side roller shaft 17L also changes.

Thereby, the state of contact of guide portion 58b1 with left-side roller shaft 17L is changed, thereby changing the state of restraint of left-side roller shaft 17L by guide member 58b. As a result, the axis deflection occurring in left-side roller shaft 17L (that is, the axis deflection occurring in left-side roller 37L) is variably adjusted.

In other words, among the above-mentioned various types of components forming left-side roller control mechanism 50B, guide member 58b corresponds to a restriction portion for restricting the axis deflection of left-side roller 37L. Also, among the above-mentioned various types of components forming left-side roller control mechanism 50B, particularly second sub-rotary motor 56b and second feed mechanism unit 57b function as an axis deflection adjustment mechanism for variably adjusting the magnitude of the axis deflection of left-side roller 37L.

(Operations of Power Transmission Mechanism, Right-Side Wing Unit and Left-Side Wing Unit)

FIGS. 8(A) to 11(C) each provide different diagrams for illustrating the operation of power transmission mechanism 30 of wing flapping apparatus 1 according to an exemplary aspect. In this case, (A) and (B) in each of FIGS. 8 to 11 are a plan view and a side view, respectively, for illustrating the operation of first motion conversion unit 30B. Also, (C) in each of FIGS. 8 to 11 is a plan view for illustrating the operations of right-side second motion conversion unit 30C1 and left-side second motion conversion unit 30C2. Then, referring to FIGS. 8(A) to 11(C) and FIG. 5 (mentioned above), the operation of power transmission mechanism 30 of wing flapping apparatus 1 will be described.

The operation of power transmission mechanism 30 described below is an operation in a time period of one counter-clockwise rotation of disk 32c as a rotation transmission member that is an output unit of rotational motion transmission unit 30A. This operation is shown in chronological order in FIGS. 8(A) to 11(C). The time period of one counter-clockwise rotation of disk 32c corresponds to one cycle of the synchronous wing flapping operations of right-side wing unit 40R and left-side wing unit 40L.

In the state shown in FIG. 5, slider 35 is located at the center position within the movable range in which slider 35 can linearly reciprocate. In this case, right-side wing unit 40R and left-side wing unit 40L are located at the positions of three o'clock and nine o'clock, respectively. Also, in a view showing right-side wing unit 40R and left-side wing unit 40L seen from above in the Z2 direction, right-side wing unit 40R and left-side wing unit 40L are located on the same straight line. In this case, the above-mentioned one end of first crank arm 33A and the above-mentioned one end of second crank arm 33B that are attached to disk 32c (that is, the end portions of the crank arms on the side where pin 34a is located) are located at the position of nine o'clock (see FIG. 4(B)). In the following description, the above-mentioned one end of first crank arm 33A and the above-mentioned one end of second crank arm 33B that are attached to disk 32c each will be referred to as a "connection point".

Figure 8A:
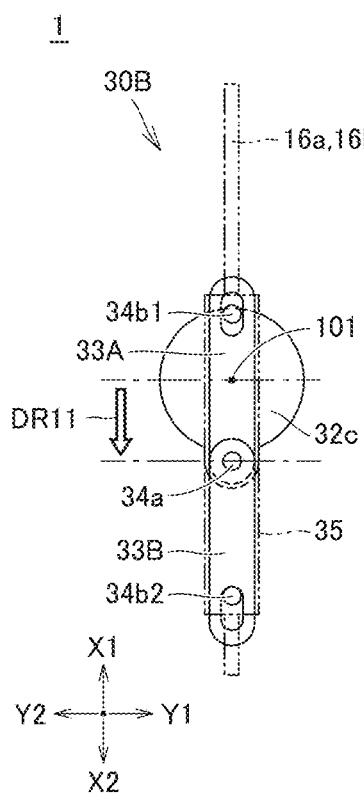
FIGS. 8(A) to 8(C) are diagrams for illustrating the operation of the power transmission mechanism of the wing flapping apparatus.
Figure 8B:
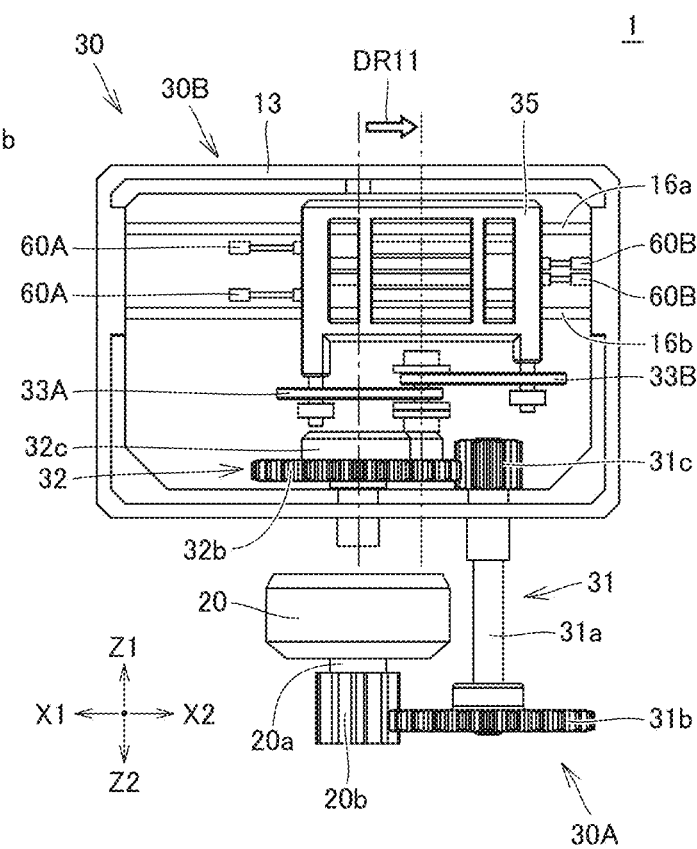
Figure 8C:
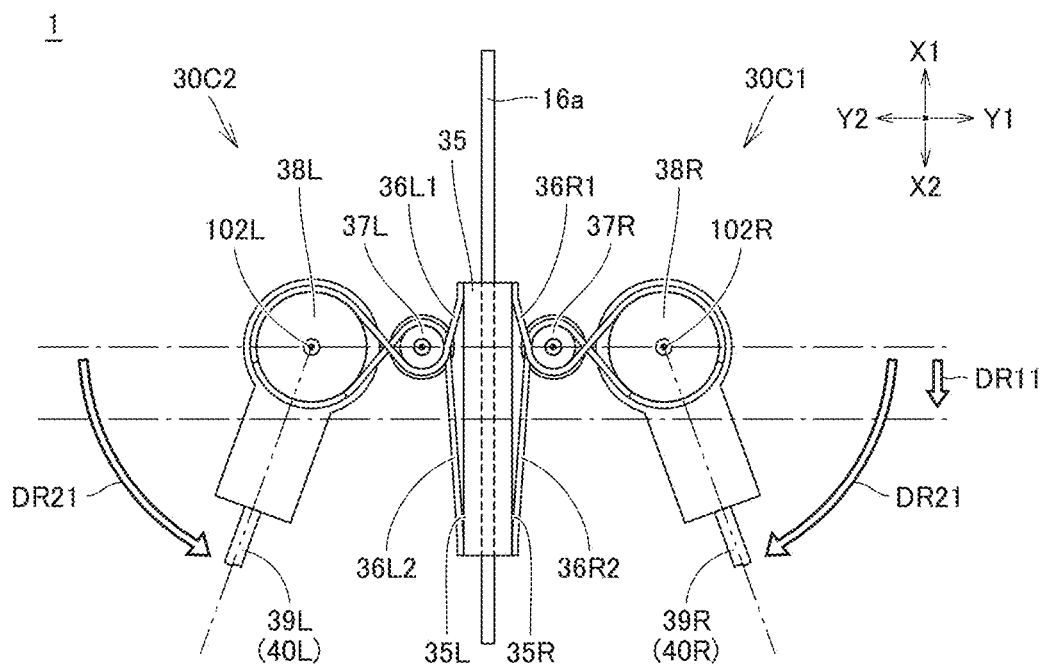

First, as shown in FIGS. 8(A) to (C), upon reception of the motive power transmitted from main rotary motor 20, disk 32c rotates from the state shown in FIG. 5 by 90° in the counter-clockwise direction. Then, the above-mentioned connection point reaches the position of six o'clock from the position of nine o'clock, during which slider 35 moves in a DR11 direction shown in the figure, thereby causing the position of the center of gravity of slider 35 also to move in the X2 direction. Then, when the connection point reaches the position of six o'clock, slider 35 is disposed at the second position that is located at the rearmost portion within the movable range.

Also in this case, right-side wing unit 40R and left-side wing unit 40L are moved in a DR21 direction shown in the figure (that is, toward the position of six o'clock) in accordance with the clockwise rotation of right-side rotating body 38R and the counter-clockwise rotation of left-side rotating body 38L, respectively. Such movements progress approximately in the X2 direction.

Figure 9A:
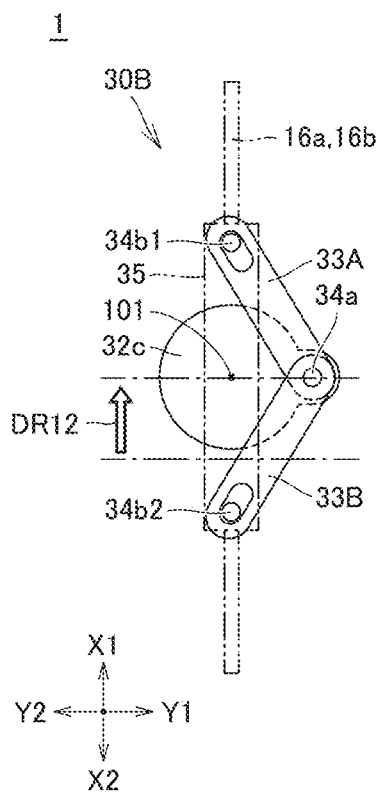
FIGS. 9(A) to 9(C) are diagrams for illustrating the operation of the power transmission mechanism of the wing flapping apparatus.
Figure 9B:
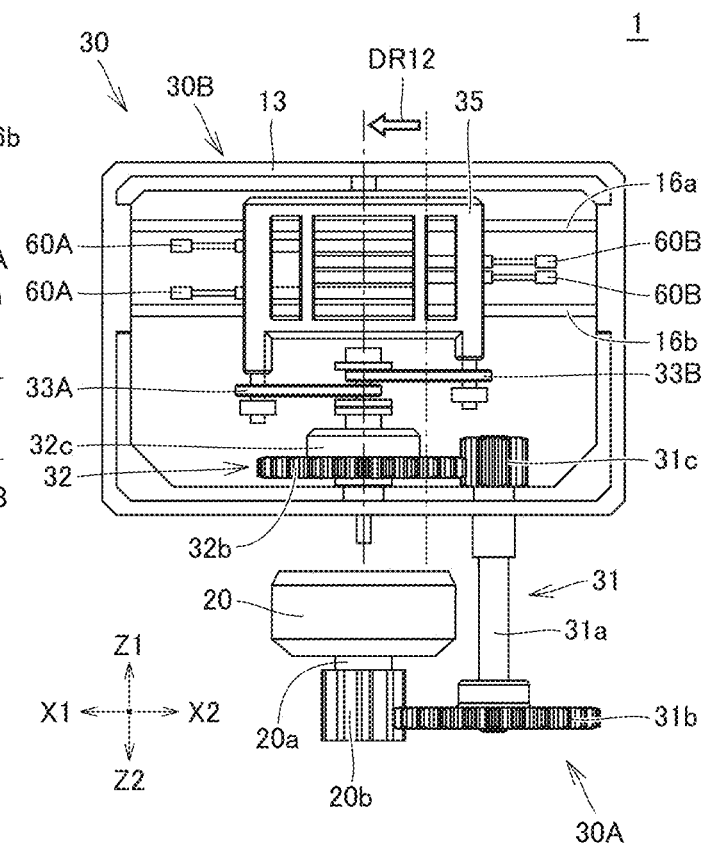
Figure 9C:
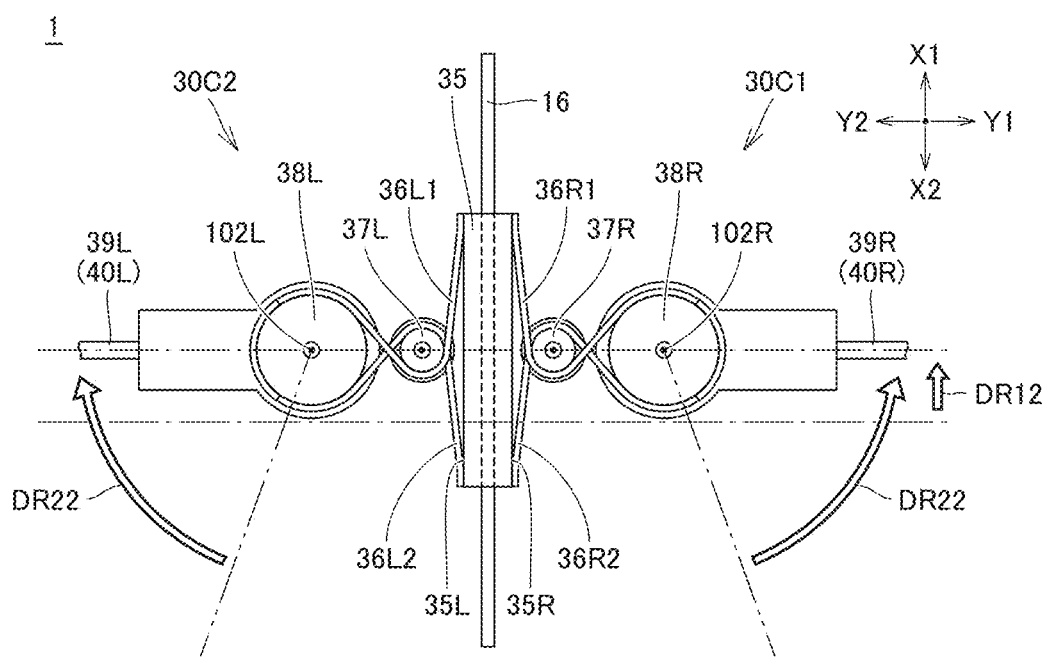

Then, as shown in FIGS. 9(A) to (C), upon reception of the motive power transmitted from main rotary motor 20, disk 32c further rotates from the state shown in FIGS. 8(A) to (C) by 90° in the counter-clockwise direction. Thereby, the above-mentioned connection point reaches the position of three o'clock from the position of six o'clock, during which slider 35 moves in a DR12 direction shown in the figure, thereby causing the position of the center of gravity of slider 35 also to move in the X1 direction.

Also in this case, right-side wing unit 40R and left-side wing unit 40L are moved in a DR22 direction shown in the figure (that is, toward the position of three o'clock and the position of nine o'clock, respectively) in accordance with the counter-clockwise rotation of right-side rotating body 38R and the clockwise rotation of left-side rotating body 38L, respectively. Such movements progress approximately in the X1 direction.

Then, as shown in FIGS. 10(A) to (C), upon reception of the motive power transmitted from main rotary motor 20, disk 32c further rotates from the state shown in FIGS. 9(A) to (C) by 90° in the counter-clockwise direction. Then, the above-mentioned connection point reaches the position of twelve o'clock from the position of three o'clock, during which slider 35 moves in a DR13 direction shown in the figure, thereby causing the position of the center of gravity of slider 35 also to move in the X1 direction. Then, when the above-mentioned connection point reaches the position of twelve o'clock, slider 35 is disposed at the first position that is located at the foremost portion within the movable range.

Also in this case, right-side wing unit 40R and left-side wing unit 40L are moved in a DR23 direction shown in the figure (that is, toward the position of twelve o'clock) in accordance with the counter-clockwise rotation of right-side rotating body 38R and the clockwise rotation of left-side rotating body 38L, respectively. Such movements progress approximately in the X1 direction.

Figure 11A:
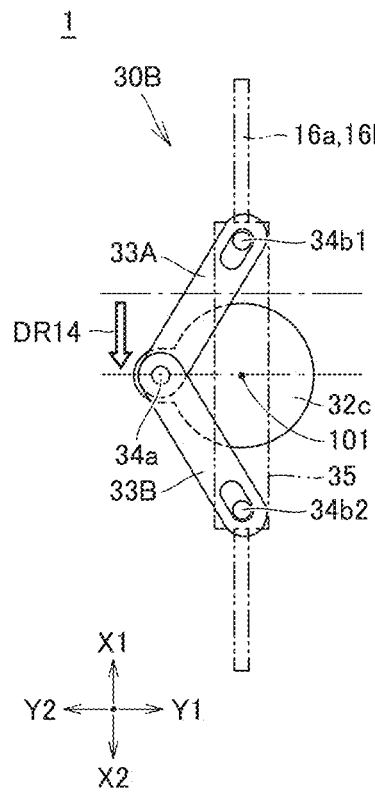
FIGS. 11(A) to 11(C) are diagrams for illustrating the operation of the power transmission mechanism of the wing flapping apparatus.
Figure 11B:
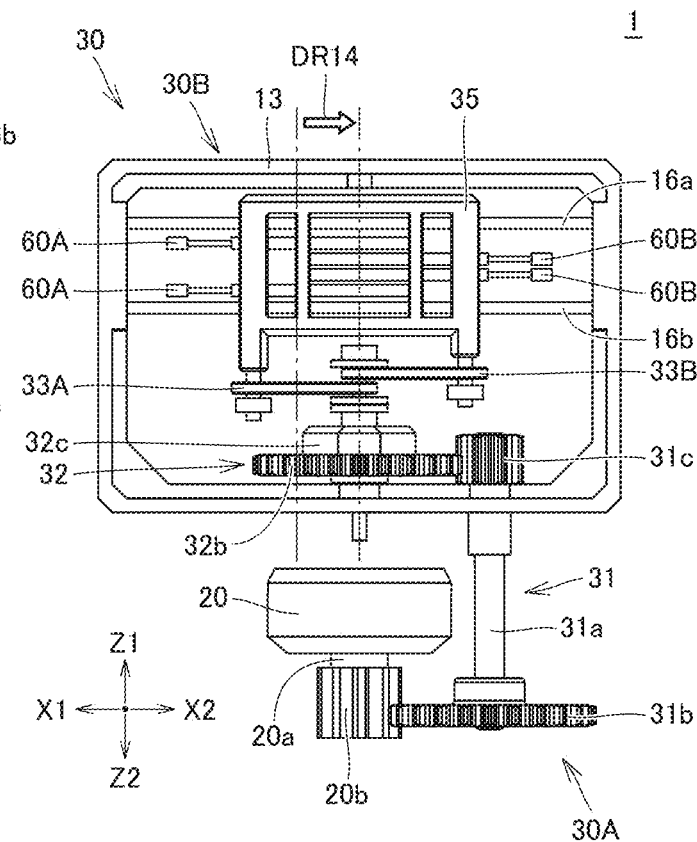
Figure 11C:
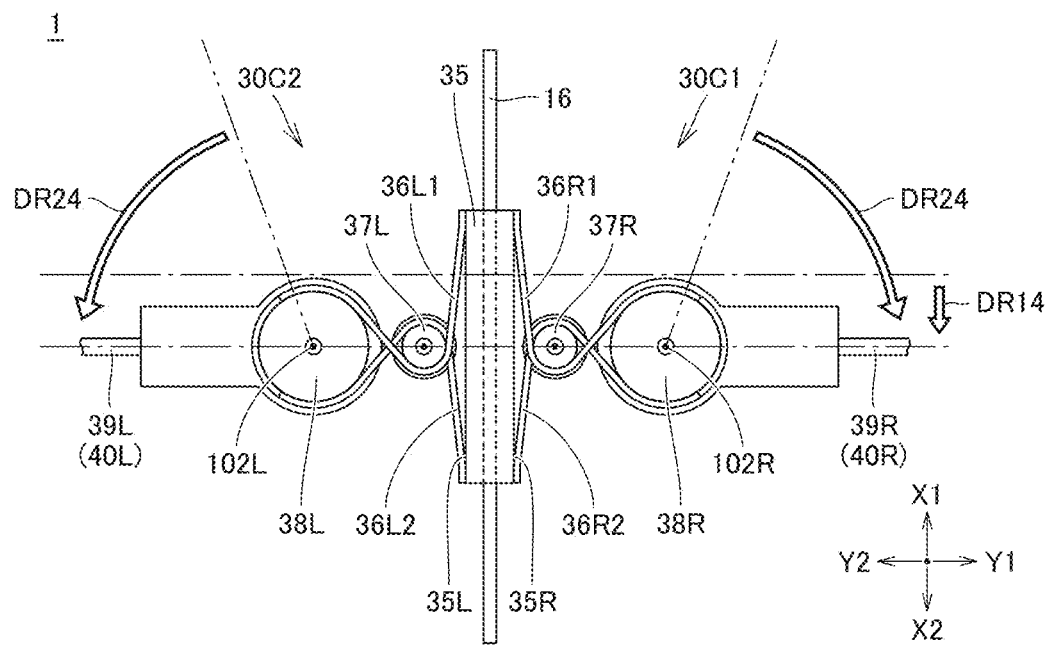

Then, as shown in FIGS. 11(A) to (C), upon reception of the motive power transmitted from main rotary motor 20, disk 32c further rotates from the state shown in FIGS. 10(A) to (C) by 90° in the counter-clockwise direction. Then, the above-mentioned connection point reaches the position of nine o'clock from the position of twelve o'clock, during which slider 35 moves in a DR14 direction shown in the figure, thereby causing the position of the center of gravity of slider 35 also to move in the X2 direction.

Also in this case, right-side wing unit 40R and left-side wing unit 40L are moved in a DR24 direction shown in the figure (that is, toward the position of three o'clock and the position of nine o'clock, respectively) in accordance with the clockwise rotation of right-side rotating body 38R and the counter-clockwise rotation of left-side rotating body 38L, respectively. Such movements progress approximately in the X2 direction.

As described above, in wing flapping apparatus 1 in the present embodiment, the motive power generated in main rotary motor 20 as a motive power source is transmitted to right-side wing unit 40R and left-side wing unit 40L through power transmission mechanism 30. Thereby, these right-side wing unit 40R and left-side wing unit 40L swing synchronously in a prescribed cycle. This leads to generation of a prescribed lift force (described later) in right-side wing unit 40R and left-side wing unit 40L, thereby allowing flight of wing flapping apparatus 1.

Figure 12:
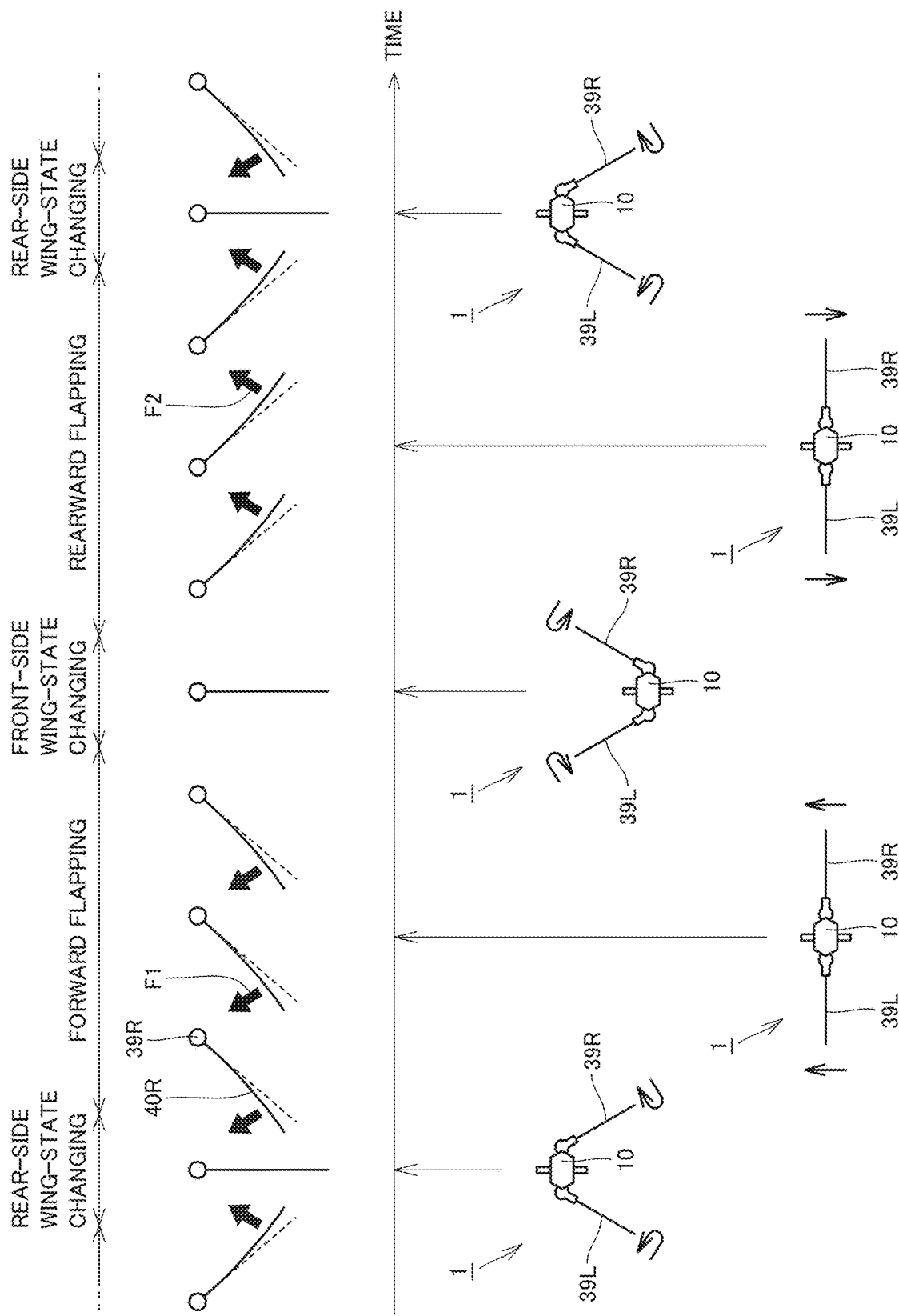
FIG. 12 is a schematic diagram showing the wing flapping operations of the right-side wing unit and the left-side wing unit during hovering of the wing flapping apparatus.

(Wing Flapping Operations of Right-Side Wing Unit and Left-Side Wing Unit) FIG. 12 is a schematic diagram showing the wing flapping operations of right-side wing unit 40R and left-side wing unit 40L during hovering of wing flapping apparatus 1. Referring to FIG. 12, the wing flapping operations of right-side wing unit 40R and left-side wing unit 40L during hovering of wing flapping apparatus 1 will be hereinafter described.

Referring to FIG. 12, when right-side wing unit 40R and left-side wing unit 40L swing as described above, right-side wing unit 40R and left-side wing unit 40L sequentially perform four operations including a rear-side wing-state changing operation, a forward flapping operation, a front-side wing-state changing operation, and a rearward flapping operation in this order during one cycle of the wing flapping operation.

In this case, in the upper row in FIG. 12, while focusing attention on right-side wing unit 40R, the above-mentioned four operations are shown in simple cross-sectional views for illustrating the shape change of right-side wing unit 40R in chronological order. In the lower row in FIG. 12, the states of wing flapping apparatus 1 during the above-mentioned four operations are shown in simple plan views. The cross section of right-side wing unit 40R shown in the upper row in FIG. 12 represents a cross section of right-side wing unit 40R in the direction orthogonal to the extending direction of right-side wing unit 40R (that is, the extending direction of right-side mast 39R). The left side in the figure corresponds to the front side of wing flapping apparatus 1 while the right side in the figure corresponds to the rear side of wing flapping apparatus 1.

The rear-side wing-state changing operation refers to an operation performed when right-side wing unit 40R and left-side wing unit 40L reach the rearmost position in the swinging range (see an arrow AR2 in the figure) shown in FIG. 5 (that is, performed in the state shown in FIG. 8). In the rear-side wing-state changing operation, the tilted postures of right-side wing unit 40R and left-side wing unit 40L change from the state where their upper edge portions are located rearward of their lower edge portions to the state where their upper edge portions are located forward of their lower edge portions.

The forward flapping operation refers to an operation performed when right-side wing unit 40R and left-side wing unit 40L are moved from the rearmost position to the foremost position in the swinging range (see arrow AR2 in the figure) shown in FIG. 5 (this operation includes the state shown in FIGS. 9(A) to (C)). In the forward flapping operation, right-side wing unit 40R and left-side wing unit 40L are moved relatively forward while maintaining the tilted postures of right-side wing unit 40R and left-side wing unit 40L in the state where their upper edge portions are located forward of their lower edge portions.

The front-side wing-state changing operation refers to an operation performed when right-side wing unit 40R and left-side wing unit 40L reach the foremost position in the swinging range (see arrow AR2 in the figure) shown in FIG. 5 (that is, performed in the state shown in FIGS. 10(A) to(C)). In the front-side wing-state changing operation, the tilted postures of right-side wing unit 40R and left-side wing unit 40L change from the state where their lower edge portions are located rearward of their upper edge portions to the state where their lower edge portions are located forward of their upper edge portions.

The rearward flapping operation refers to an operation performed when right-side wing unit 40R and left-side wing unit 40L are moved from the foremost position to the rearmost position in the swinging range (see arrow AR2 in the figure) shown in FIG. 5 (this operation includes the state shown in FIGS. 11(A) to(C)). In the rearward flapping operation, right-side wing unit 40R and left-side wing unit 40L are moved relatively rearward while maintaining the tilted postures of right-side wing unit 40R and left-side wing unit 40L in the state where their lower edge portions are located forward of their upper edge portions.

Particularly during two operations of the forward flapping operation and the rearward flapping operation among four operations of the rear-side wing-state changing operation, the forward flapping operation, the front-side wing-state changing operation, and the rearward flapping operation, obliquely-upward fluid force occurs in right-side wing unit 40R as indicated by arrows F1 and F2 in the upper row in FIG. 12. In this case, when the horizontal component of the fluid force (corresponding to arrow F1 shown in the figure) occurring during forward flapping and the horizontal component of the fluid force (corresponding to arrow F2 shown in the figure) occurring during rearward flapping are balanced in the front-rear direction, upward lift force occurs in right-side wing unit 40R. Upward lift force similarly occurs also in left-side wing unit 40L, though no explanation will be given.

As described above, right-side wing unit 40R and left-side wing unit 40L are driven so as to synchronously reciprocate in the front-rear direction. Accordingly, these wing units operate in mirror symmetry as shown in the lower row in FIG. 12. Thus, by the lift force generated in right-side wing unit 40R and the lift force generated in left-side wing unit 40L, upward levitation force is generated in wing flapping apparatus 1. This allows flight of wing flapping apparatus 1.

[Detailed Explanation of Structure of Wing Unit and Method of Manufacturing Wing Unit]

Figure 13:
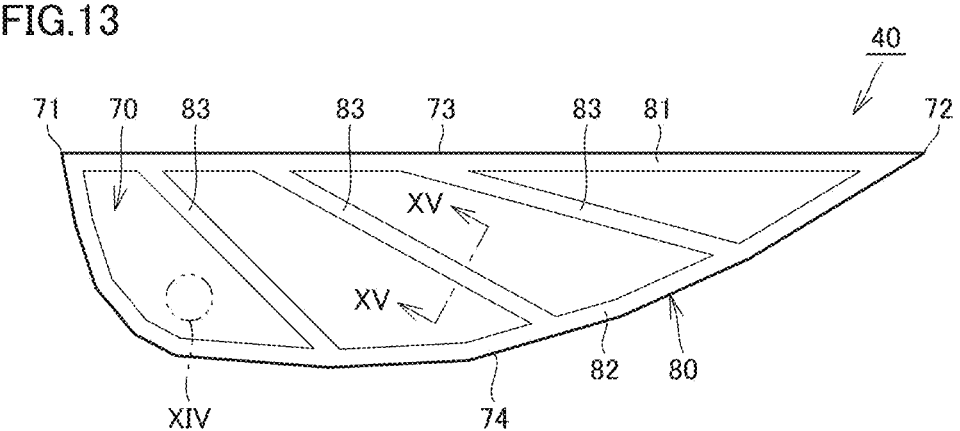
FIG. 13 is a plan view showing a wing unit included in the wing flapping apparatus in FIG. 1.

FIG. 13 is a plan view showing a wing unit included in the wing flapping apparatus in FIG. 1. Although FIG. 13 representatively shows only left-side wing unit 40L in FIG. 1, right-side wing unit 40R and left-side wing unit 40L in FIG. 1 have the same structure. In the following description, right-side wing unit 40R and left-side wing unit 40L in FIG. 1 will be commonly referred to as a "wing unit 40" unless specifically distinguished. Also, right-side mast 39R and left-side mast 39L in FIG. 1 will be commonly referred to as a "mast 39" unless specifically distinguished.

As shown in FIGS. 1 and 13, right-side wing unit 40R extends from right-side rotating body 38R in FIG. 5 in the Y1 direction while left-side wing unit 40L extends from left-side rotating body 38L in FIG. 5 in the Y2 direction.

Wing unit 40 includes a nonwoven fabric 70, a frame body 80, and a resin material (not shown). Nonwoven fabric 70 forms a wing surface of wing unit 40. Nonwoven fabric 70 has flexibility. Nonwoven fabric 70 may be made of a natural material or may be made of a synthetic fiber.

Frame body 80 is provided along the wing surface formed by nonwoven fabric 70 (along the surface of nonwoven fabric 70). Frame body 80 extends in a strip shape on the wing surface formed by nonwoven fabric 70. Frame body 80 is made of a material that has high strength, is readily flexible and is resistant to repeated deformation. Frame body 80 is made of carbon fiber reinforced plastics (CFRP) or an ABS resin, for example.

Nonwoven fabric 70 is formed of components including a root portion 71, a tip end portion 72, a leading edge portion (upper edge portion) 73, and a trailing edge portion (lower edge portion) 74. The wing surface is formed in the region surrounded by root portion 71, tip end portion 72, leading edge portion 73, and trailing edge portion 74.

Root portion 71 is provided at a position in nonwoven fabric 70 that is closest to the swinging center (second rotation axes 102R and 102L in FIG. 5) of wing unit 40. Tip end portion 72 is located at a distance from root portion 71. Tip end portion 72 is provided at the tip end of wing unit 40 extending from each of right-side rotating body 38R and left-side rotating body 38L in FIG. 5. Leading edge portion 73 extends between root portion 71 and tip end portion 72. Leading edge portion 73 extends linearly between root portion 71 and tip end portion 72. Leading edge portion 73 extends in the Y-axis direction between root portion 71 and tip end portion 72. Mast 39 is provided along leading edge portion 73. The swinging motion is input into leading edge portion 73 through mast 39. Trailing edge portion 74 extends between root portion 71 and tip end portion 72. Trailing edge portion 74 extends between root portion 71 and tip end portion 72 in a bent and/or curved manner. Trailing edge portion 74 operates behind leading edge portion 73 in response to the input of the swinging motion into leading edge portion 73.

Leading edge portion 73 and trailing edge portion 74 face each other in the up-down direction (the Z-axis direction) across the wing surface formed by nonwoven fabric 70. Trailing edge portion 74 is disposed below leading edge portion 73. Nonwoven fabric 70 hangs down in the up-down direction between leading edge portion 73 and trailing edge portion 74. Nonwoven fabric 70 is formed in an elongated shape having: a long-side direction extending in the direction (the Y-axis direction) connecting root portion 71 and tip end portion 72; and a short-side direction extending in the direction (the Z-axis direction) in which leading edge portion 73 and trailing edge portion 74 face each other.

Frame body 80 is formed of components including a first frame portion 81, a second frame portion 82, and a branch portion 83.

First frame portion 81 extends along leading edge portion 73. Second frame portion 82 extends along trailing edge portion 74. Second frame portion 82 forms a frame shape together with first frame portion 81. First frame portion 81 and second frame portion 82 extend in a strip shape along the circumferential edge of the wing surface formed by nonwoven fabric 70.

Branch portion 83 is provided in the region surrounded by first frame portion 81 and second frame portion 82. Branch portion 83 extends between first frame portion 81 and second frame portion 82. Branch portion 83 extends linearly between first frame portion 81 and second frame portion 82. Branch portion 83 extends from first frame portion 81 to second frame portion 82 while approaching tip end portion 72 from root portion 71 in the direction (the Y direction) connecting root portion 71 and tip end portion 72. A plurality of branch portions 83 extend between first frame portion 81 and second frame portion 82.

The shape (path) of the branch portion that extends between first frame portion 81 and second frame portion 82 is not limited to the above-described configuration. For example, the branch portion may extend in a curved shape between first frame portion 81 and second frame portion 82. Alternatively, a branch portion (the above-mentioned branch portion 83) extending from first frame portion 81 to second frame portion 82 while approaching tip end portion 72 from root portion 71 in the direction (the Y-axis direction) connecting root portion 71 and tip end portion 72 may cross a branch portion extending from second frame portion 82 to first frame portion 81 while approaching tip end portion 72 from root portion 71 in the direction (the Y-axis direction) connecting root portion 71 and tip end portion 72.

Figure 14:
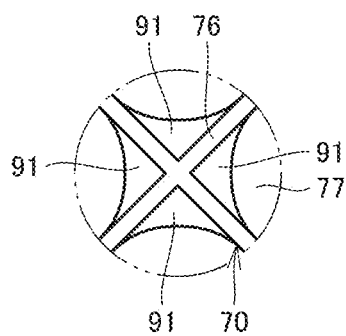
FIG. 14 is an enlarged view showing the surface of the wing unit in a range surrounded by a two-dot chain line XIV in FIG. 13.
Figure 15:
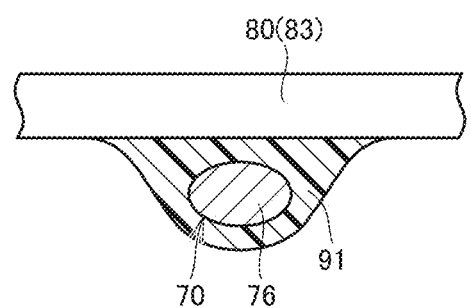
FIG. 15 is an enlarged view showing the cross section of the wing unit as seen in the direction indicated by an arrow line XV-XV in FIG. 13.

FIG. 14 is an enlarged view showing the surface of the wing unit in the range surrounded by a two-dot chain line XIV in FIG. 13. FIG. 15 is an enlarged view showing the cross section of the wing unit as seen in the direction indicated by an arrow line XV-XV in FIG. 13.

Referring to FIGS. 13 to 15, nonwoven fabric 70 is formed by intertwining fibers 76 without weaving fibers 76. A cavity 77 is included in nonwoven fabric 70. Cavity 77 is formed as a gap existing between fibers 76.

According to the exemplary aspect, resin material 91 is disposed in cavity 77, and, more particularly, resin material 91 is disposed in a part of a space in cavity 77. In other words, resin material 91 is provided such that not the entire space in cavity 77 is filled therewith. As a typical example, resin material 91 is provided so as to spread from the position of intersection between fibers 76 toward the corner portion of fibers 76 intersecting with each other. Resin material 91 is disposed over the entire surface of nonwoven fabric 70 while partially leaving a gap (an air layer) formed due to cavity 77.

In this aspect, nonwoven fabric 70 and frame body 80 are integrated with each other by resin material 91. Nonwoven fabric 70 and frame body 80 are integrated with each other by resin material 91 disposed on the surface layer of nonwoven fabric 70.

Nonwoven fabric 70 can be made of polyester, for example. It is preferable that the material used for nonwoven fabric 70 has a heat-resistant temperature equal or to higher than 200° C. It is preferable that the weight (weight per unit area) of nonwoven fabric 70 is equal to or less than 10 mg/m$^2$.

Resin material 91 can be made of polypropylene (PP) or polyethylene terephthalate (PET), for example. It is preferable that resin material 91 is provided in a proportion of 5 mg/m$^2$ or less with respect to nonwoven fabric 70.

Figure 16:
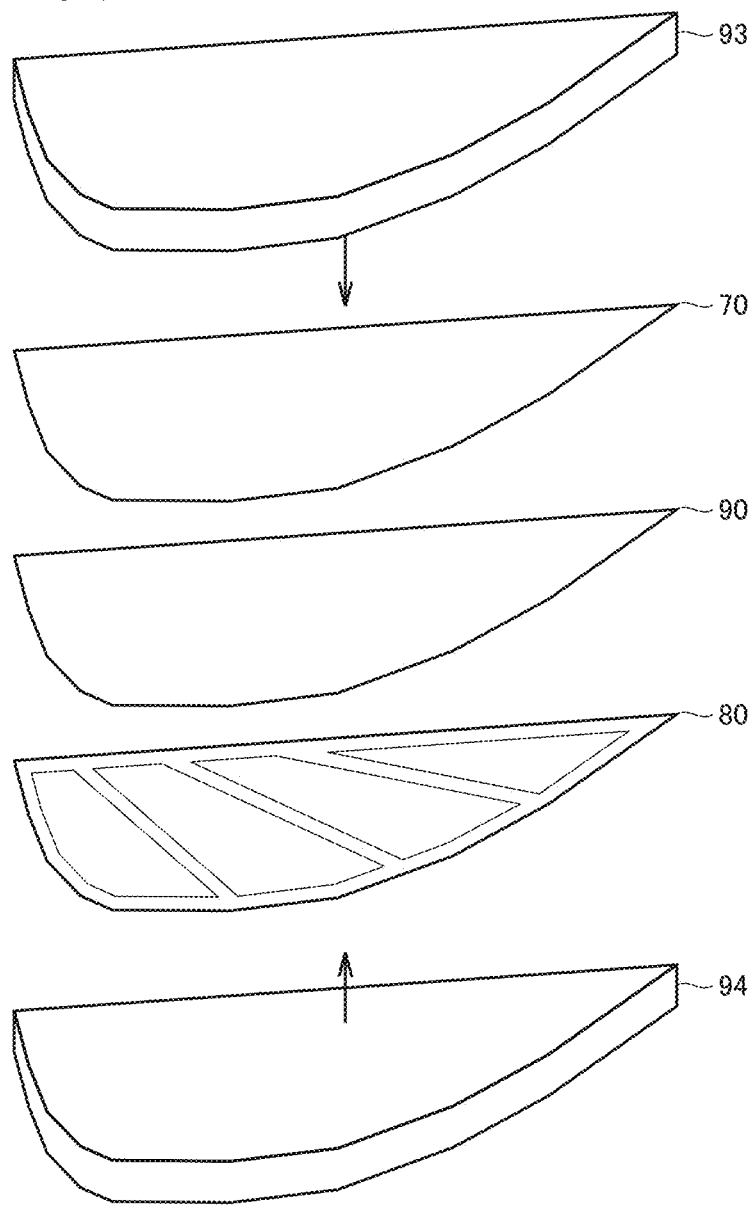
FIG. 16 is a perspective view showing a method of manufacturing a wing unit in an embodiment.

FIG. 16 is a perspective view showing a method of manufacturing a wing unit in an embodiment. FIG. 16 shows the steps in the method of manufacturing the wing unit in FIG. 13.

Referring to FIG. 16, nonwoven fabric 70, a resin sheet 90 (a sheet-shaped resin material) and frame body 80 are first prepared.

More specifically, a nonwoven fabric is cut to obtain nonwoven fabric 70 having a prescribed wing shape. The raw material (for example, CFRP or a plate-shaped or rod-shaped member containing carbon fibers) of frame body 80 is processed to obtain frame body 80 having a prescribed frame shape. The resin sheet (for example, a PP resin sheet) made of the same material as resin material 91 is cut to obtain resin sheet 90 having the same shape as nonwoven fabric 70.

Then, a stacked body including nonwoven fabric 70, resin sheet 90 and frame body 80 is pressurized in its stacking direction while heating the stacked body, thereby integrating nonwoven fabric 70 and frame body 80 with each other by resin material 91.

More specifically, nonwoven fabric 70, resin sheet 90 and frame body 80 are superimposed on one another in this order between an upper mold 93 and a lower mold 94. Upper mold 93 and lower mold 94 are moved close to each other to apply pressure to the stacked body in its stacking direction while heating the stacked body. Thus, by the configuration in which the resin material forming resin sheet 90 is introduced into the cavity included in nonwoven fabric 70, resin sheet 90 is welded to nonwoven fabric 70, and simultaneously, nonwoven fabric 70 and frame body 80 are integrated with each other by the resin material as an adhesive introduced into the cavity. Thereby, wing unit 40 formed of nonwoven fabric 70, frame body 80 and resin material 91 as shown in FIGS. 13 to 15 is fabricated.

In order to prevent adhesion of the resin to the mold, it is preferable that a thin film of polytetrafluoroethylene or silicon is provided so as to cover the surfaces of upper mold 93 and lower mold 94. Furthermore, a sheet made of polytetrafluoroethylene or a sheet made of silicon may be interposed between the stacked body and each of upper mold 93 and lower mold 94.

In the above-described step of integrating nonwoven fabric 70 and frame body 80 with each other, it is preferable to heat the stacked body at a temperature less than the heat-resistant temperature of nonwoven fabric 70 and equal to or higher than the melting temperature of resin material 91. In this case, nonwoven fabric 70 and frame body 80 can be more reliably integrated with each other by resin material 91 while preventing the quality of nonwoven fabric 70 from being deteriorated by heating.

According to wing unit 40 configured as described above and the manufacturing method thereof, nonwoven fabric 70 is used as a structural material forming a wing surface. Since nonwoven fabric 70 is a light-weight material including a large number of cavities 77, wing unit 40 can be reduced in weight. Furthermore, nonwoven fabric 70 formed by intertwining fibers is less likely to be ripped. Also, frame body 80 is provided along the wing surface of nonwoven fabric 70. Accordingly, high-strength wing unit 40 can be obtained.

Furthermore, nonwoven fabric 70 including a large number of cavities 77 is excellent in sound absorbing effect. Furthermore, nonwoven fabric 70 is formed not by weaving a large number of fibers 76 and is excellent in flexibility. Thus, the noise (i.e., the wing flapping noise) occurring during the swinging motion of wing unit 40 can be reduced. In this case, since resin material 91 is disposed in a part of the space in cavity 77 of nonwoven fabric 70, the effect of reducing such a wing flapping noise can be excellently achieved. Furthermore, resin material 91 disposed in cavity 77 of nonwoven fabric 70 also functions as a reinforcing member for increasing the strength of the wing unit.

It is preferable that resin sheet 90 is less in thickness than nonwoven fabric 70 in the steps of manufacturing wing unit 40. By way of example, resin sheet 90 has a thickness of 2 μm and nonwoven fabric 70 has a thickness of 5 μm. By the configuration as described above, it becomes possible to more readily achieve a configuration in which resin material 91 is disposed in a part of the space in cavity 77 of nonwoven fabric 70.

It is preferable that wing unit 40 having the above-described configuration has a weight of 50 mg or less per 15 cm². It is preferable that wing unit 40 has a strength that can withstand a wind pressure of 20 m/s. When wing unit 40 has a length of 70 mm in the Y-axis direction, it is preferable that a thrust force of 15 g is achieved by one sheet of wing unit 40.

Figure 17:
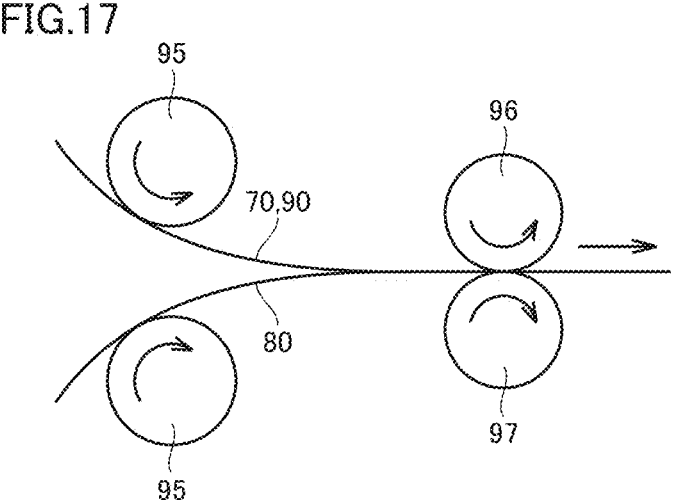
FIG. 17 is a diagram showing the first modification of the method of manufacturing a wing unit in an embodiment.

FIG. 17 is a diagram showing the first modification of the method of manufacturing a wing unit in an embodiment. Referring to FIG. 17, in the present modification, resin material 91 is disposed in the cavity included in nonwoven fabric 70 before the step of integrating nonwoven fabric 70 and frame body 80 with each other. Examples of such a method may include a method of welding nonwoven fabric 70 and resin sheet 90 by heating; a method of preparing a resin material in a fluid state and impregnating nonwoven fabric 70 with the resin material; and the like.

Then, by heating the stacked body formed of frame body 80 and nonwoven fabric 70 that includes resin material 91, nonwoven fabric 70 and frame body 80 are integrated with each other by resin material 91.

In the example shown in FIG. 17, frame body 80 and nonwoven fabric 70 that includes resin material 91 are fed by a feed roller 95 toward between a heating roller 96 and a heating roller 97. When nonwoven fabric 70 and frame body 80 are heated between heating roller 96 and heating roller 97, nonwoven fabric 70 and frame body 80 are integrated with each other by resin material 91 (welding).

In addition, nonwoven fabric 70 and frame body 80 between heating roller 96 and heating roller 97 may be applied with pressure in the direction in which heating roller 96 and heating roller 97 are pressed into contact with each other (thermocompression bonding).

As shown in the present modification, in the state where resin material 91 is provided in advance in the cavity of nonwoven fabric 70, nonwoven fabric 70 and frame body 80 may be welded or thermocompression-bonded to each other. According to the present modification, it becomes possible to more readily achieve a configuration in which resin material 91 is disposed in a part of the space in cavity 77 of nonwoven fabric 70.

Figure 18:
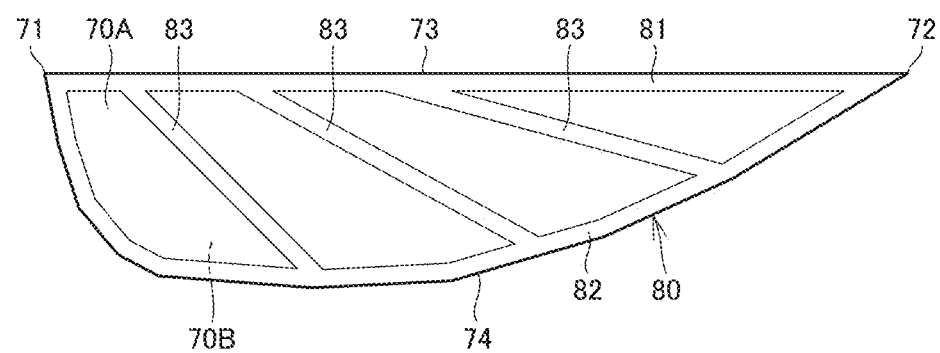
FIG. 18 is a plan view showing the first modification of the wing unit in FIG. 13.

FIG. 18 is a plan view showing the first modification of the wing unit in FIG. 13. Referring to FIG. 18, the wing unit in the present modification includes a nonwoven fabric 70A, a frame body 80, a resin material (not shown), and a nonwoven fabric 70B.

Nonwoven fabric 70A and nonwoven fabric 70B have the same shape. Nonwoven fabric 70A and nonwoven fabric 70B are provided so as to sandwich frame body 80 therebetween. Nonwoven fabric 70A and frame body 80 are integrated with each other by the resin material disposed in the cavity of nonwoven fabric 70A. Nonwoven fabric 70B and frame body 80 are integrated with each other by the resin material disposed in the cavity of nonwoven fabric 70B. Nonwoven fabric 70A and nonwoven fabric 70B are joined to each other by the resin material disposed in the cavity of each of these nonwoven fabrics.

Figure 19:
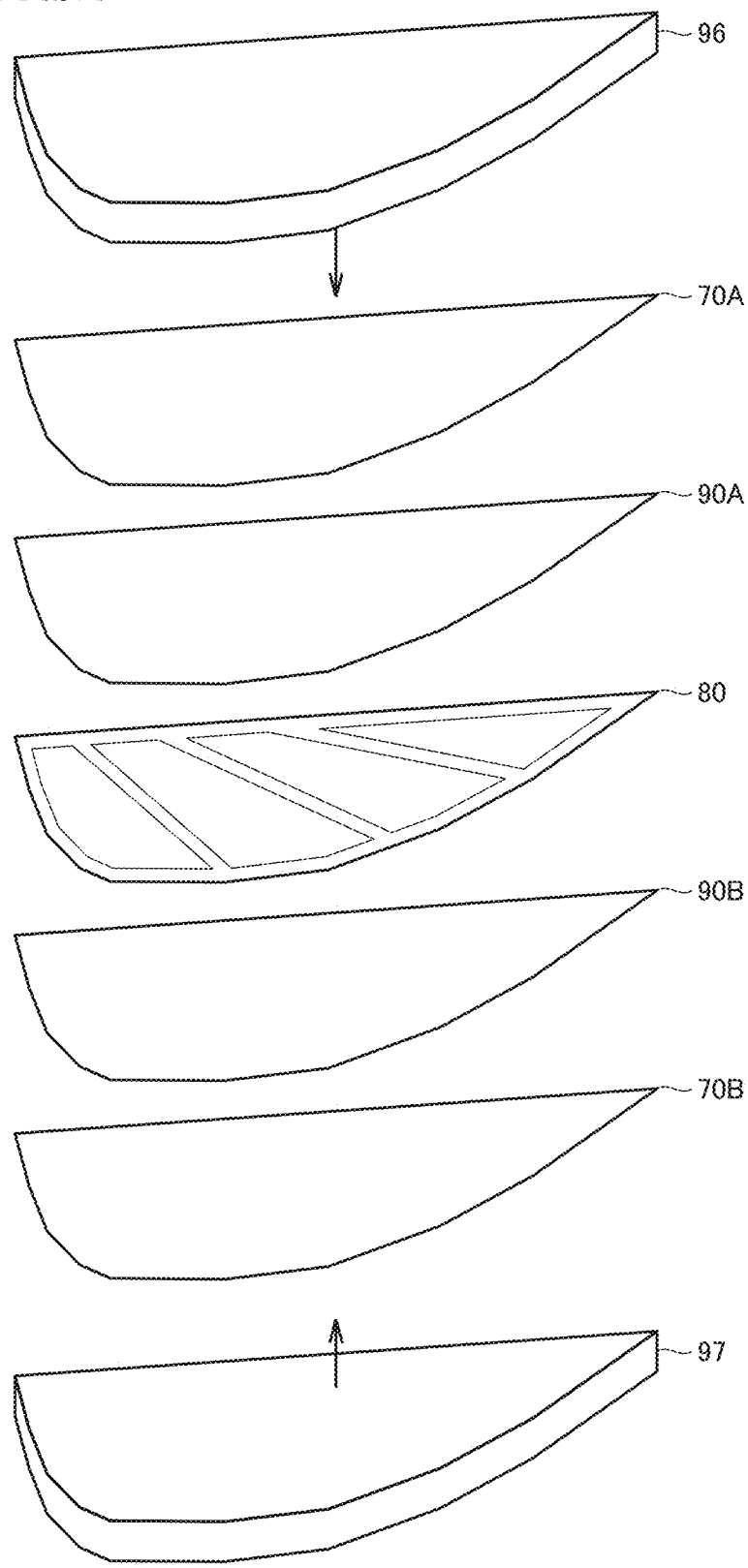
FIG. 19 is a diagram showing the second modification of the method of manufacturing a wing unit in an embodiment.

FIG. 19 is a diagram showing the second modification of the method of manufacturing a wing unit in an embodiment. FIG. 19 shows the step in the method of manufacturing the wing unit in FIG. 18.

Referring to FIG. 19, in the present modification, a nonwoven fabric 70A, a resin sheet 90A, a frame body 80, a resin sheet 90B, and a nonwoven fabric 70B are first prepared.

Then, a stacked body including nonwoven fabric 70A, resin sheet 90A, frame body 80, resin sheet 90B, and nonwoven fabric 70B is pressurized in its stacking direction while heating the stacked body, thereby integrating nonwoven fabric 70A, frame body 80 and nonwoven fabric 70B with one another by resin material 91. More specifically, nonwoven fabric 70A, resin sheet 90A, frame body 80, resin sheet 90B, and nonwoven fabric 70B are superimposed on one another in this order between an upper mold 93 and a lower mold 94. Upper mold 93 and lower mold 94 are moved closer to each other to apply pressure to the stacked body in its stacking direction while heating the stacked body.

According to the configuration as described above, nonwoven fabric 70A and nonwoven fabric 70B are joined to each other in the state where frame body 80 is sandwiched therebetween, so that wing unit 40 can be further improved in strength. Furthermore, the structure of wing unit 40 is symmetric between the front surface and the back surface of wing unit 40, so that a bidirectional camber is readily formed during the swinging motion of wing unit 40. This allows wing unit 40 to flap at a symmetric flapping speed, so that the thrust force can be effectively increased.

Figure 20:
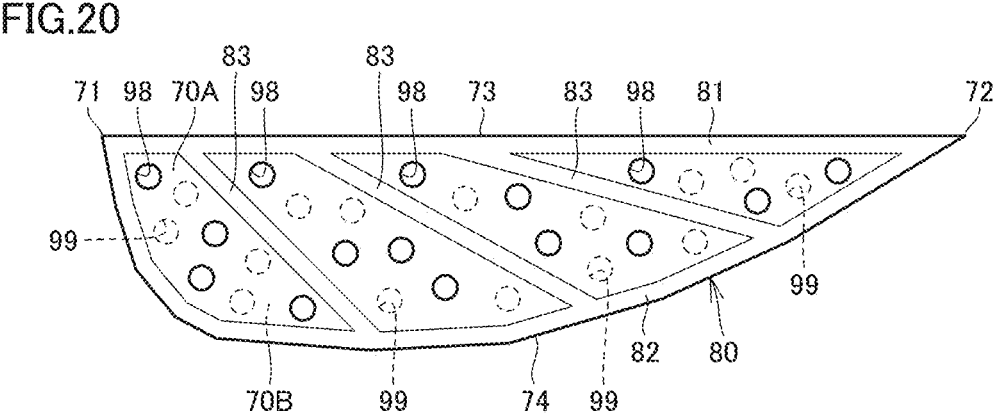
FIG. 20 is a plan view showing the second modification of the wing unit in FIG. 13.

FIG. 20 is a plan view showing the second modification of the wing unit in FIG. 13. Referring to FIG. 20, in the present modification, nonwoven fabric 70A and nonwoven fabric 70B in FIG. 18 are provided with a through hole 98 and a through hole 99, respectively. Through hole 98 and through hole 99 are provided so as not to overlap with each other in the direction in which nonwoven fabric 70A and nonwoven fabric 70B are stacked.

According to the configuration as described above, the increase in weight of wing unit 40 can be suppressed even though nonwoven fabric 70A and nonwoven fabric 70B are used.

In the following description, the configuration of the present disclosure and the functions and effects achieved by the present disclosure will be summarized.

A wing unit according to the present disclosure serves as a wing unit used in a wing flapping apparatus and configured to perform a swinging motion to generate levitation force. The wing unit includes: a nonwoven fabric that forms a wing surface; a frame body overlaid on the nonwoven fabric and extending along the wing surface; and a resin material disposed in a cavity included in the nonwoven fabric to integrate the nonwoven fabric and the frame body with each other.

According to the wing unit configured as described above, a nonwoven fabric and a frame body that extends along a wing surface formed by the nonwoven fabric are integrated with each other by a resin material disposed in a cavity included in the nonwoven fabric. Thereby, a light-weight and high-strength wing unit can be implemented. In this case, by using a nonwoven fabric that is excellent in sound absorbing performance and flexibility as a structural material forming a wing surface, a wing flapping noise can be reduced.

Further preferably, the resin material is disposed in a part of a space in the cavity included in the nonwoven fabric.

According to the wing unit configured in this way, the effect of reducing a wing flapping noise by using a nonwoven fabric can be excellently achieved.

Further preferably, as the nonwoven fabric, a first nonwoven fabric and a second nonwoven fabric that are stacked with the frame body interposed therebetween are provided.

According to the wing unit configured in this way, the wing unit having a higher strength can be achieved. Furthermore, an excellent symmetry is achieved between the front side and the back side of the wing surface, so that the thrust force generated during the swinging motion of the wing unit can be increased.

Further preferably, the first nonwoven fabric and the second nonwoven fabric are provided with a first through hole and a second through hole, respectively. The first through hole and the second through hole are disposed so as not to overlap with each other in a direction in which the first nonwoven fabric and the second nonwoven fabric are stacked.

According to the wing unit configured in this way, an increase in weight of the wing unit can be suppressed even though the first nonwoven fabric and the second nonwoven fabric are used.

A wing flapping apparatus according to the present disclosure includes the wing unit described in any of the above; a framework; and an actuator mounted in the framework and configured to input a swinging motion to the wing unit.

According to the wing flapping apparatus configured in this way, it becomes possible to implement a wing flapping apparatus that is excellent in energy efficiency and produces a suppressed wing flapping noise.

A method of manufacturing a wing unit according to the present disclosure is a method of manufacturing a wing unit used in a wing flapping apparatus and configured to perform a swinging motion to generate levitation force. The method of manufacturing a wing unit includes: preparing a nonwoven fabric, a resin material and a frame body; and heating a stacked body including the nonwoven fabric, the resin material and the frame body, and thereby integrating the nonwoven fabric and the frame body with each other by the resin material.

According to the method of manufacturing a wing unit configured in this way, it becomes possible to achieve a light-weight and a high-strength wing unit that produces a suppressed wing flapping noise.

Further preferably, the integrating the nonwoven fabric and the frame body with each other includes pressurizing the stacked body in a stacking direction of the stacked body while heating the stacked body.

According to the method of manufacturing a wing unit configured in this way, the nonwoven fabric and the frame body can be more reliably integrated with each other by a resin material.

Further preferably, the integrating the nonwoven fabric and the frame body with each other includes heating the stacked body at a temperature lower than a heat-resistant temperature of the nonwoven fabric and equal to or higher than a melting temperature of the resin material.

According to the method of manufacturing a wing unit configured in this way, the nonwoven fabric and the frame body can be more reliably integrated with each other by a resin material while maintaining the quality of the nonwoven fabric.

Further preferably, the preparing a nonwoven fabric, a resin material and a frame body includes preparing the nonwoven fabric, the resin material in a form of a sheet smaller in thickness than the nonwoven fabric, and the frame body.

According to the method of manufacturing a wing unit configured in this way, it becomes possible to more readily achieve a configuration in which a resin material is disposed in a part of a space in a cavity included in a nonwoven fabric. Thereby, the effect of reducing a wing flapping noise by using a nonwoven fabric can be excellently achieved.

Further preferably, the method of manufacturing a wing unit further includes disposing the resin material in a cavity included in the nonwoven fabric before the integrating the nonwoven fabric and the frame body with each other. The integrating the nonwoven fabric and the frame body with each other includes heating a stacked body formed of the nonwoven fabric that includes the cavity having the resin material disposed therein and the frame body, and thereby integrating the nonwoven fabric and the frame body with each other by the resin material.

According to the method of manufacturing a wing unit configured in this way, it becomes possible to more readily achieve a configuration in which a resin material is disposed in a part of a space in a cavity included in a nonwoven fabric. Thereby, the effect of reducing a wing flapping noise by using a nonwoven fabric can be excellently achieved.

It should be understood that the exemplary embodiments disclosed herein are illustrative and non-restrictive in every respect. Moreover, the scope of the present invention is defined by the terms of the claims, rather than the description above, and is intended to include any modifications within the meaning and scope equivalent to the terms of the claims.

The present disclosure is mainly applied to a wing flapping apparatus configured to perform a swinging motion to thereby achieve levitation force.

REFERENCE SIGNS LIST

1 wing flapping apparatus, 10 framework, 11 lower frame, 12 upper frame, 13 support frame, 14 pillar-shaped frame, 15 stem, 16a, 16b slide guide, 17L left-side roller shaft, 17R right-side roller shaft, 18L left-side guide shaft, 18R right-side guide shaft, 19L1 left-side upper arm, 19L2 left-side lower arm, 19R1 right-side upper arm, 19R2 right-side lower arm, 20 main rotary motor, 20a output shaft, 20b, 31b, 31c, 32b gear, 30 power transmission mechanism, 30A rotational motion transmission unit, 30B first motion conversion unit, 30C1 right-side second motion conversion unit, 30C2 left-side second motion conversion unit, 31 first transmission member, 31a first connection rod, 32 second transmission member, 32a second connection rod, 32c disk, 33A first crank arm, 33B second crank arm, 34a, 34b1, 34b2 crank pin, 35 slider, 35L left-side surface, 35R right-side surface, 36L1 front left-side elastic belt, 36L2 rear left-side elastic belt, 36R1 front right-side elastic belt, 36R2 rear right-side elastic belt, 37L left-side roller, 37R right-side roller, 38L left-side rotating body, 38R right-side rotating body, 39 mast, 39L left-side mast, 39R right-side mast, 40 wing unit, 40L left-side wing unit, 40R right-side wing unit, 50 control mechanism, 50A right-side roller control mechanism, 50B left-side roller control mechanism, 51a, 51b first stage, 52a, 52b first sub-rotary motor, 53a, 53b first feed mechanism unit, 54a, 54b coupling member, 55a, 55b second stage, 56a, 56b second sub-rotary motor, 57a, 57b second feed mechanism unit, 58a, 58b guide member, 58a1, 58b1 guide portion, 60A front-side elastic body, 60B rear-side elastic body, 70, 70A, 70B nonwoven fabric, 71 root portion, 72 tip end portion, 73 leading edge portion, 74 trailing edge portion, 76 fiber, 77 cavity, 80 frame body, 81 first frame portion, 82 second frame portion, 83 branch portion, 90, 90A, 90B resin sheet, 91 resin material, 93 upper mold, 94 lower mold, 95 feed roller, 96 heating roller, 98, 99 through hole, 101 first rotation shaft, 102L, 102R second rotation shaft.

The invention claimed is:

1. A wing unit for performing a swinging motion to generate levitation force for a wing flapping apparatus, the wing unit comprising:
   a wing surface comprising a nonwoven fabric including a leading edge portion and a trailing edge portion with the wing surface extending therebetween;
   a frame body overlaid on the nonwoven fabric by extending in a strip shape along at least the leading edge portion and the trailing edge portion of the wing surface; and
   a resin material disposed entirely over the wing surface and disposed in a cavity included in the nonwoven fabric to integrate the nonwoven fabric with the frame body.

2. The wing unit according to claim 1, wherein the resin material is disposed in a portion of a space in the cavity included in the nonwoven fabric.

3. The wing unit according to claim 2, wherein the cavity is formed as a gap between fibers of the nonwoven fabric.

4. The wing unit according to claim 3, wherein the resin material is formed only in a portion of the gap between the fibers of the nonwoven fabric, such that at least a portion of the gap is not filled with the resin material.

5. The wing unit according to claim 1, wherein the nonwoven fabric comprises first and second nonwoven fabrics that are stacked with the frame body interposed therebetween.

6. The wing unit according to claim 5, wherein the first nonwoven fabric and the second nonwoven fabric each include a first through hole and a second through hole, respectively, extending therethrough.

7. The wing unit according to claim 6, wherein the first through hole and the second through hole are disposed in the nonwoven fabric so as not to overlap with each other in a stacking direction of the first and second nonwoven fabrics.

8. A wing flapping apparatus comprising:
   a wing unit for generating a levitation force for the wing flapping apparatus, the wing unit comprising:
      a wing surface comprising a nonwoven fabric including a leading edge portion and a trailing edge portion with the wing surface extending therebetween,
      a frame body overlaid on the nonwoven fabric by extending in a strip shape along at least the leading edge portion and the trailing edge portion of the wing surface, and
      a resin material disposed entirely over the wing surface and disposed in a cavity included in the nonwoven fabric to integrate the nonwoven fabric with the frame body;
   a framework; and
   an actuator mounted in the framework and configured to generate a swinging motion to the wing unit to generate the levitation force.

9. The wing flapping apparatus according to claim 8, wherein the resin material is disposed in a portion of a space in the cavity included in the nonwoven fabric.

10. The wing flapping apparatus according to claim 9, wherein the cavity is formed as a gap between fibers of the nonwoven fabric.

11. The wing flapping apparatus according to claim 10, wherein the resin material is formed only in a portion of the gap between the fibers of the nonwoven fabric, such that at least a portion of the gap is not filled with the resin material.

12. The wing flapping apparatus according to claim 8, wherein the nonwoven fabric comprises first and second nonwoven fabrics that are stacked with the frame body interposed therebetween.

13. The wing flapping apparatus according to claim 12, wherein the first nonwoven fabric and the second nonwoven fabric each include a first through hole and a second through hole, respectively, extending therethrough, and
   wherein the first through hole and the second through hole are disposed in the nonwoven fabric so as not to overlap with each other in a stacking direction of the first and second nonwoven fabrics.

14. A method of manufacturing a wing unit for performing a swinging motion to generate levitation force for a wing flapping apparatus, the method comprising:
   preparing a nonwoven fabric that includes a leading edge portion and a trailing edge portion with a wing surface extending therebetween, a resin material in a form of a sheet and that is identical in shape to the nonwoven fabric, and a frame body that extends in a strip shape along at least the leading edge portion and the trailing edge portion of the wing surface; and
   heating a stacked body including the nonwoven fabric, the resin material and the frame body, thereby integrating the nonwoven fabric and the frame body with each other by the resin material.

15. The method of manufacturing a wing unit according to claim 14, wherein the integrating of the nonwoven fabric with the frame body comprises pressurizing the stacked body in a stacking direction while heating the stacked body.

16. The method of manufacturing a wing unit according to claim 15, wherein the integrating the nonwoven fabric with the frame body comprises heating the stacked body at a temperature lower than a heat-resistant temperature of the nonwoven fabric and equal to or higher than a melting temperature of the resin material.

17. The method of manufacturing a wing unit according to claim 14, further comprising preparing the nonwoven fabric and the resin material as a sheet having a smaller thickness than the nonwoven fabric and the frame body.

18. The method of manufacturing a wing unit according to claim 14, further comprising disposing the resin material in a cavity included in the nonwoven fabric before integrating the nonwoven fabric with the frame body.

19. The method of manufacturing a wing unit according to claim 18, further comprising heating the stacked body formed of the nonwoven fabric that includes the cavity having the resin material disposed therein and the frame body to integrate the nonwoven fabric with the frame body by the resin material.

20. The method of manufacturing a wing unit according to claim 18, further comprising forming the resin material only in a portion of the cavity, such that at least a portion of the cavity is not filled with the resin material.

\* \* \* \* \*